United States Patent
Robinson et al.

(10) Patent No.: US 12,281,905 B2
(45) Date of Patent: Apr. 22, 2025

(54) SYSTEMS AND METHODS FOR COST-BASED FORWARD SEARCH BASED ON PRECOMPUTED BIDIRECTIONAL SEARCH

(71) Applicant: Verizon Patent and Licensing Inc., Basking Ridge, NJ (US)

(72) Inventors: Nathan M. Robinson, Christchurch (NZ); Hayden Sean White, Kaiapoi (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 458 days.

(21) Appl. No.: 17/458,843

(22) Filed: Aug. 27, 2021

(65) Prior Publication Data

US 2023/0060187 A1    Mar. 2, 2023

(51) Int. Cl.
  *G01C 21/34*    (2006.01)
(52) U.S. Cl.
  CPC ..... *G01C 21/3446* (2013.01); *G01C 21/3461* (2013.01)
(58) Field of Classification Search
  CPC .......... G01C 21/3446; G01C 21/3461
  See application file for complete search history.

(56) References Cited

U.S. PATENT DOCUMENTS

| 11,392,128 | B1* | 7/2022 | Ma | G05D 1/0212 |
| 2013/0013204 | A1* | 1/2013 | Kazama | G01C 21/3461 |
| | | | | 701/533 |
| 2016/0305787 | A1* | 10/2016 | Sato | G08G 1/096844 |
| 2018/0172463 | A1* | 6/2018 | Morales | H04L 67/131 |
| 2019/0236187 | A1* | 8/2019 | Fitchett | G06F 16/9024 |
| 2020/0132502 | A1* | 4/2020 | Beaurepaire | G01C 21/3492 |
| 2020/0191590 | A1* | 6/2020 | Yamagishi | G01C 21/3492 |
| 2021/0341302 | A1* | 11/2021 | Duym | G01C 21/3453 |

OTHER PUBLICATIONS

D. Harabor et al., "Forward Search in Contraction Hierarchies," The Eleventh International Symposium on Combinatorial Search, Jul. 2018 (available at https://aaai.org/ocs/index.php/SOCS/SOCS18/paper/view/17970/17100).

* cited by examiner

*Primary Examiner* — Aniss Chad
*Assistant Examiner* — Stephanie T Su

(57) ABSTRACT

A system described herein may provide a technique for a determination of a path through a node map using one or more searches. The nodes may be associated with respective priorities. A first search may be performed from a first node in ascending order of priority. A second search may be performed from a second node in ascending order of priority, until a third node, traversed during the first search is reached. A third search may be performed from the third node, in descending order of priority, until the first node is reached. The third search may be restricted only to nodes traversed during the first search. A path that is based on the second and third searches may be provided in response to a navigation request from a starting point associated with the second node to a destination associated with the first node.

20 Claims, 19 Drawing Sheets

SYSTEMS AND METHODS FOR COST-BASED FORWARD SEARCH BASED ON PRECOMPUTED BIDIRECTIONAL SEARCH

BACKGROUND

Navigation systems may have the ability to generate turn-by-turn navigation directions from arbitrary starting points to arbitrary destinations. Some systems may precompute directions for commonly traveled routes using contraction hierarchies or other similar techniques, in which a set of turns, paths, or the like are contracted into a single "shortcut" that represents the turns, paths, etc. Such precomputed shortcuts may be used when generating particular navigation instructions at "query" time from a particular starting point to a particular destination, thus saving time and processing resources that would be expended after the query is received.

DETAILED DESCRIPTION OF EXAMPLE EMBODIMENTS

The following detailed description refers to the accompanying drawings. The same reference numbers in different drawings may identify the same or similar elements.

Embodiments described herein provide for the determination of an optimal path through a node map that includes a set of nodes. For example, a set of navigation instructions, including a set of roads, turns, intersections, etc. may be determined in a manner that minimizes travel time, fuel costs, or is otherwise "optimal" according to a given set of criteria. As discussed below, some embodiments may make use of one or more bi-directional searches, one or more reverse searches, or some other suitable technique in order to precompute a filtered set of nodes (e.g., where nodes represent intersections, roads, shortcuts, or the like) that are reachable from a given node (e.g., a destination associated with a navigation request). In some embodiments, such searches may be determined based on priority, importance, and/or some other attribute of respective nodes. Some embodiments may further search (e.g., perform one or more forward searches) from a node associated with a starting point associated with the navigation request, utilizing the filtered set of nodes (e.g., associated with the bi-directional search, reverse search, etc. performed with respect to the destination). The filtered set may be a subset of the nodes in the node map (e.g., less than all of the nodes in the node map). The forward search may omit nodes in the node map that are not in the filtered set of nodes, thus reducing the number of nodes to be evaluated based on the search.

This reduction in nodes may result in a savings of processing resources, time, and/or other resources. Further, performing a forward search from the navigation starting point (e.g., based on the filtered set of nodes) to the navigation destination may allow for the accurate computation of costs associated with routes from the starting point to the destination, where "costs" may include or may be based on travel time, fuel consumption, and/or other suitable types of costs. As one example, traffic along a given road segment may vary over time, and may be able to be modeled, predicted, etc. based on an expected time at which a given user, vehicle, etc. travels on the given road segment. A forward search provides the opportunity to model, predict, etc. times at which a given user, vehicle, etc. will travel along a given road segment, based on previous road segments traveled along a requested route. On the other hand, a reverse search (e.g., from the destination) may not readily be used to determine time-varying costs associated with particular road segments, such as traffic that varies over time, since the reverse search may not be able to account for times at which a user, vehicle, etc. is traveling toward the destination.

Figure 1:
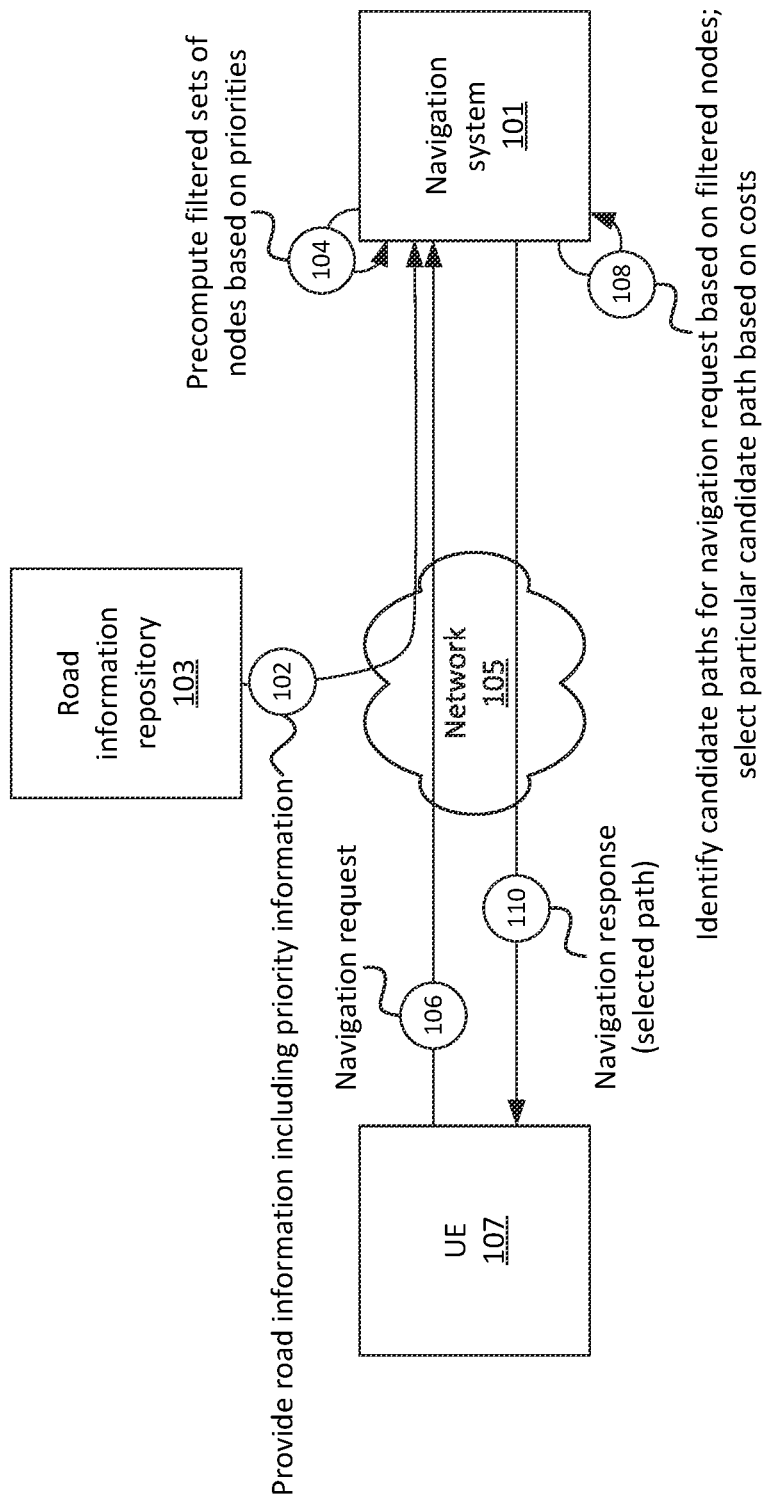
FIG. 1 illustrates an example overview of one or more embodiments described herein.

As shown in FIG. 1, navigation system 101 may receive (at 102) road information from road information repository 103. For example, navigation system 101 may receive the information from road information repository 103 via network 105, which may include the Internet, a core of wireless network, a radio access network ("RAN"), a Local Area Network ("LAN"), or some other type of network. In some embodiments, navigation system 101 and road information repository 103 may be implemented by the same device or system, and/or may be co-located in the same facility, data center, etc.

The road information, provided (at 102) by road information repository 103 may include information describing locations and/or attributes of roads, intersections, traffic signs, or the like. The attributes may include information such as road width, number of lanes, a measure of traffic that traverses a given road (e.g., average amount of vehicles per hour, median amount of vehicles per day, etc.), and/or other attributes or metrics. In some embodiments, road information may include real time or near-real time information, such as traffic information that indicates how light or how heavy traffic is at a given road or road segment, information indicating traffic-related events such as accidents or road work, and/or other types of suitable information which may impact traffic time or other metrics associated with the road or road segment.

Figure 2:
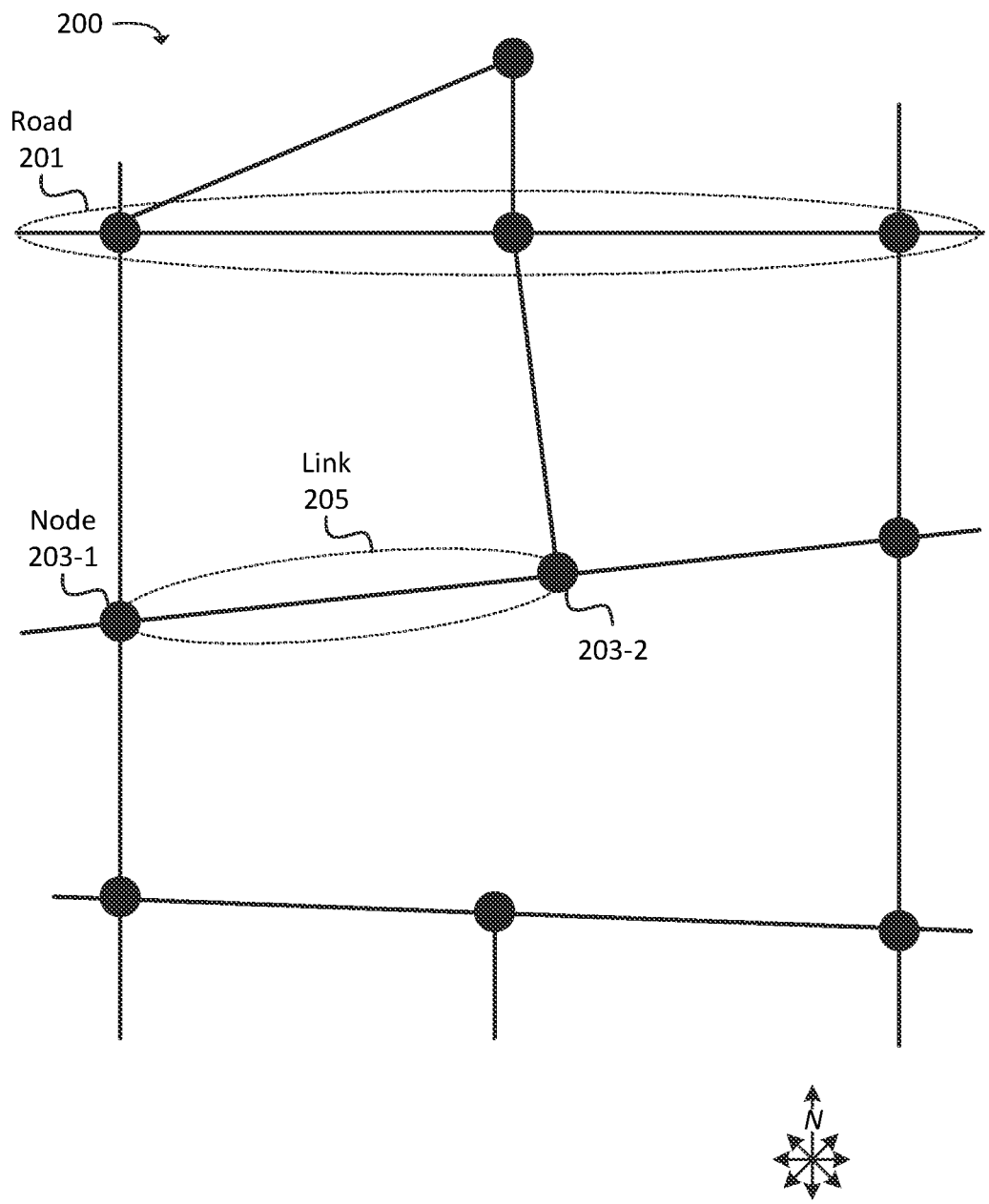
FIG. 2 illustrates an example node map representing a set of roads and intersections.

In some embodiments, the road information may be provided as or represented as a node map, in which nodes in the node map represent intersections between roads, and links between nodes represent roads or road segments. Additionally, or alternatively, navigation system 101 may generate a node map based on road information provided by road information repository 103. FIG. 2 illustrates an example node map 200 representing a set of roads and intersections. As shown, node map 200 may represent a set of roads, including road 201. Node map 200 may further include a set of nodes, such as nodes 203-1 and 203-2. Link 205 may represent a road segment that would be traversed when traveling from node 203-1 to node 203-2, or vice versa. Nodes 203 in node map 200 may represent intersections between a given road segment or shortcut (e.g., a first link 205) and another road segment or shortcut (e.g., a second link 205). In some embodiments, a particular node 203 may itself represent a shortcut (e.g., a set of roads and/or intersections).

In some embodiments, node map 200 may be or may represent a contraction hierarchy, in which multiple roads and/or intersections may be "contracted" and represented as links 205 (e.g., "shortcuts"). For example, link 205 may be a shortcut that represents multiple road segments and/or intersections in some situations. Such road segments and/or intersections may be contracted into a single link 205 (e.g., a shortcut) based on various factors, such as how commonly used such road segments and/or intersections are in paths between given nodes, how many alternative nodes or paths exist as compared to the contracted road segments and/or intersections, and/or other factors.

Figure 3:
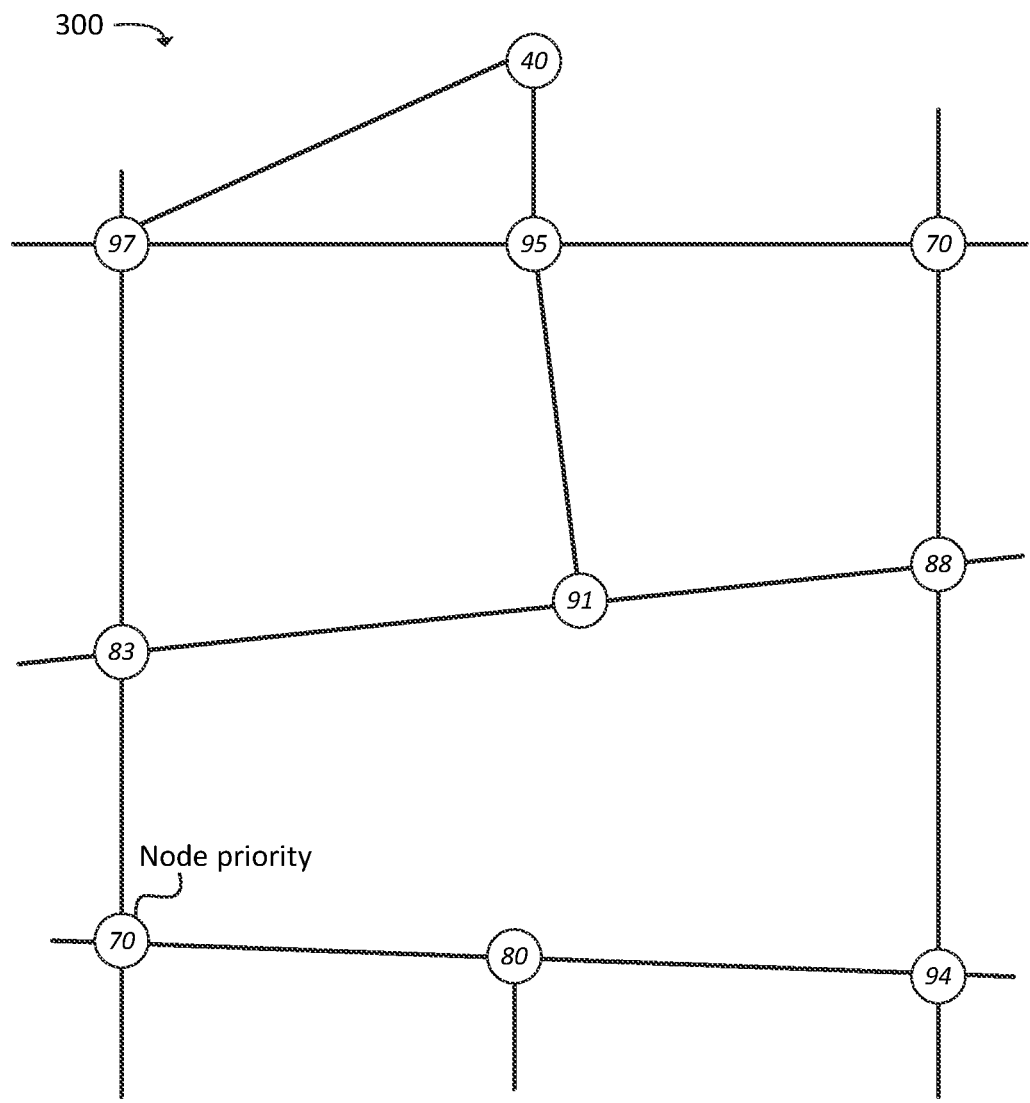
FIG. 3 illustrates an example node map representing priorities associated with each node.

As shown in FIG. 3, the road information (e.g., provided by road information repository 103 at 102) may include priorities, "importance" scores, and/or other metrics (referred to herein simply as "priority" for the sake of brevity) regarding particular nodes. Additionally, or alternatively, navigation system 101 may determine priorities of one or more nodes associated with the road information. For example, navigation system 101 may generate or receive node map 300, which may include the same links and nodes depicted in node map 200. As shown in FIG. 3, some or all of the nodes of node map 300 may be associated with a respective priority. For example, road information repository 103 (and/or some other device or system) may provide an indication of priority associated with each node, and/or navigation system 101 may determine the priority of each node. As one example, a node with a relatively high priority may be associated with or may include a "main" road, a road with at least a threshold number of lanes, a road that is relatively well-known, a road that is associated with a relatively high (e.g., at least a threshold) measure of safety, and/or may otherwise be or include a high-priority road. On the other hand, a node with a relatively low priority may be associated with or may include a "side" road, a road with less than a threshold number of lanes, a road that is relatively not well-known, a road that is associated with a relatively low (e.g., below a threshold) measure of safety, and/or may otherwise be or include a low-priority road. The priorities for particular nodes may be determined as part of a determination of a contraction hierarchy associated with node map 300 or as part of some other suitable procedure. Shortcuts may be used to preserve optimality when performing searches for optimal paths between nodes, such as when traversing nodes in descending order of priority.

As further noted in FIG. 1, navigation system 101 may determine (e.g., precompute) filtered sets of nodes based on node priorities. Navigation system 101 may, for example, perform a search, such as a bi-directional search, a reverse search, etc. with respect to one or more nodes of node map 300. Navigation system 101 may perform multiple iterations of searches in order to identify multiple paths associated with a given node (e.g., may start at the node and may identify multiple paths originating from the given node). In some embodiments, navigation system 101 may perform multiple iterations of the reverse search to identify paths (e.g., one or more paths) associated with multiple nodes. For example, navigation system 101 may identify multiple sets of paths, each associated with a respective starting node. Such searches are referred to herein as a "reverse search" with respect to a given ending node or destination that may associated with a navigation request. However, the determination or precomputation of a filtered set of nodes (e.g., including a "reverse search") may be performed independently of any navigation request. For example, the results of a "reverse search" (e.g., identification of filtered set of nodes) may be performed with respect to multiple nodes, and the filtered set of nodes associated with a particular node may be used when a navigation request is received with that particular node as a destination of the navigation request.

Figure 4:
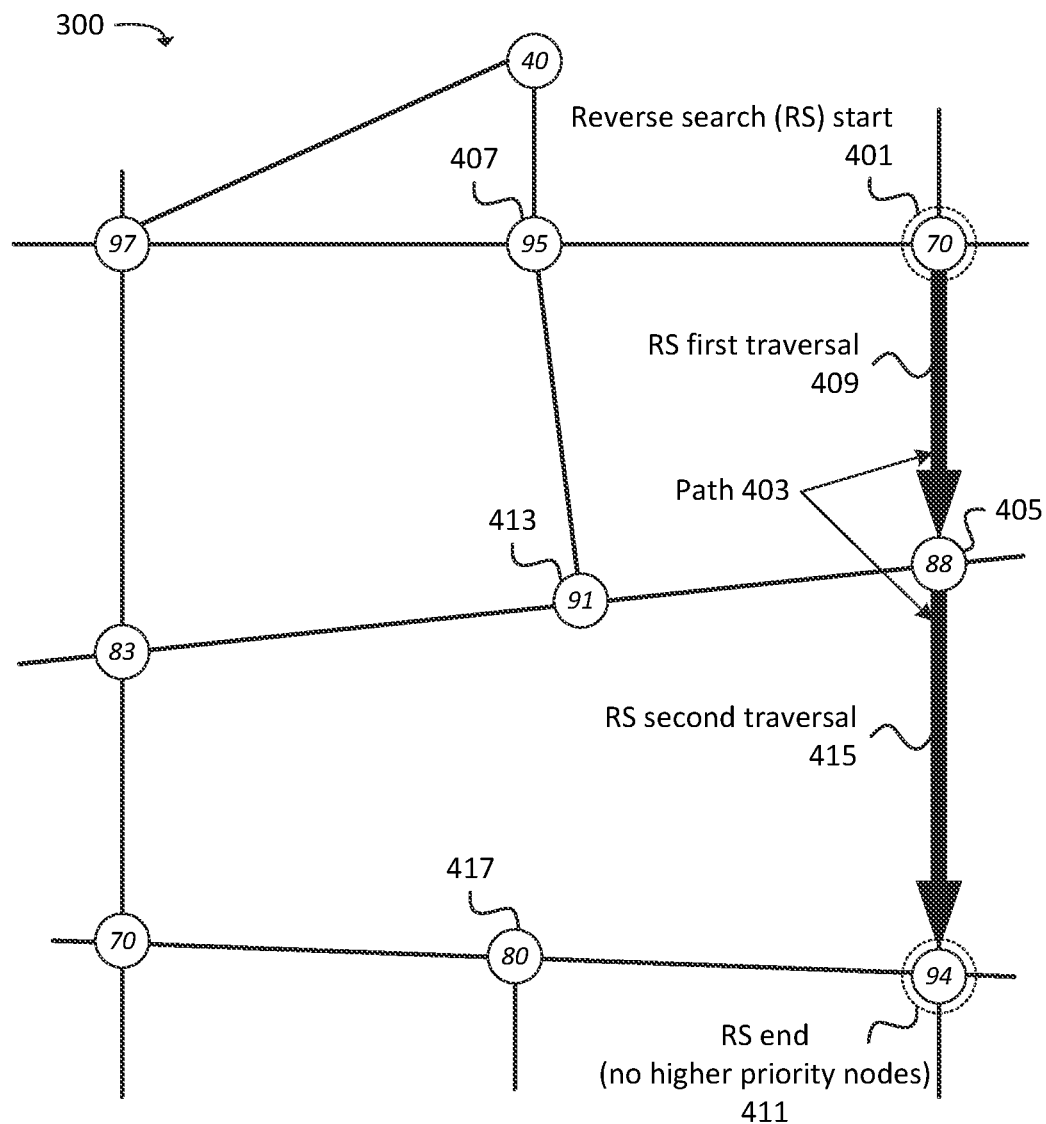
FIGS. 4 and 5 illustrate examples of a search of nodes in the node map from a particular node, in ascending order of priority, in accordance with some embodiments.

For example, as shown in FIG. 4, navigation system 101 may perform an example set of searches starting from a particular node 401 of node map 300. FIG. 4 illustrates one example path 403 starting at node 401 that may be determined based on performing the precomputation (at 104). As noted above, path 403 may be one path out of multiple identified paths with node 401 as a starting node. Further, as also noted above, similar operations may be performed with respect to multiple nodes, such that one or more paths may be identified with respect to multiple starting nodes.

In the example search of FIG. 4, navigation system 101 may traverse nodes in ascending order of priority. "Traversing" a node, as discussed herein, may refer to starting at a particular node and ending at a node that is connected to the particular node via a link. In accordance with some embodiments, the reverse search (performed at 104) may include identifying paths from node 401 that include a sequence of links between nodes of node map 300, where each subsequent node of a given sequence of links is associated with a higher priority than each preceding node in the sequence of links. For example, as shown, when starting at node 401, nodes 405 and 407 are candidates for traversal for the search. In the search iteration of this example, node 405 is selected as the first traversal of nodes in the search. In other iterations, node 407 may be selected as the first traversal of nodes in the search.

Once node 405 has been traversed from node 401 (e.g., via link 409), nodes 411 and 413 may be candidates for the next traversal from node 405. For example, nodes 411 and 413 may both be associated with a higher priority than node 405, and may therefore be candidates for traversal from node 405 for this search iteration. That is, in this example, node 411 (having a priority of 94) and node 413 (having a priority of 91) may both be candidates for traversal from node 405, since node 405 is associated with a priority of 88. In the iteration shown in this example, node 411 may be selected for the second traversal of the search (e.g., via link 415). In other iterations or in other examples, node 413 may be selected for the second traversal.

In this example, this iteration of the search may cease, end. etc. (e.g., path 403 may be complete) at node 411, as no additional nodes with a higher priority are available for traversal from node 411. For example, node 417, which is reachable from node 411, has a lower priority than node 411.

In some embodiments, the search may continue when nodes with equal priority are available for a next traversal in the search. For example, a search with a node having a priority of 95 may continue to a next node if the next node also has a priority of 95. That is, in some embodiments, the search may be completed when no nodes with greater priority than the last node are available, and may continue when one or more nodes with greater or equal priority as compared to the last node are available. In other embodiments, the search may be completed when only nodes with lesser or equal priority than the last node are available, and may continue when one or more nodes with greater priority than the last node are available.

Figure 5:
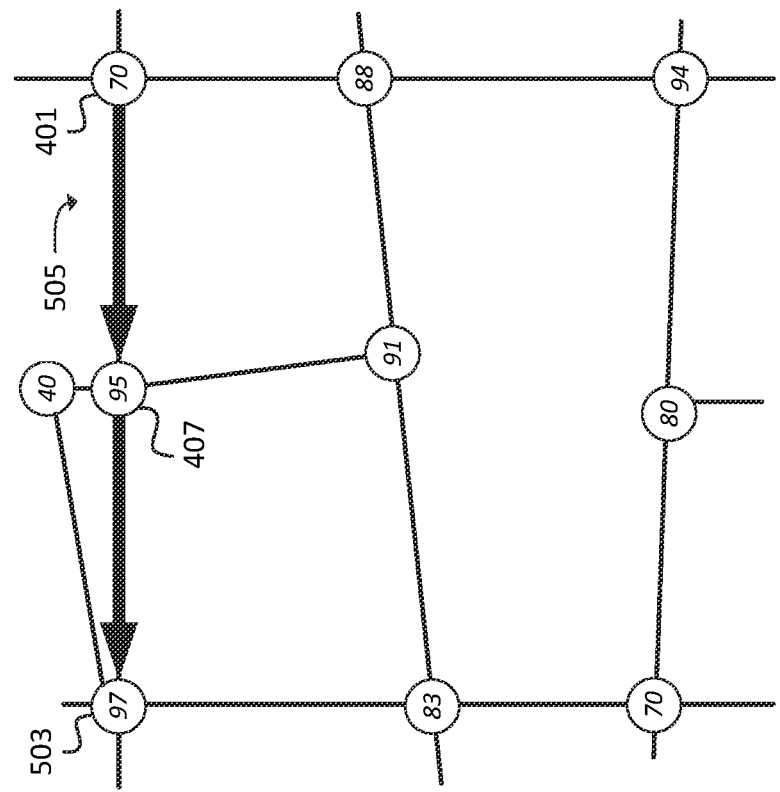
Figure 5:
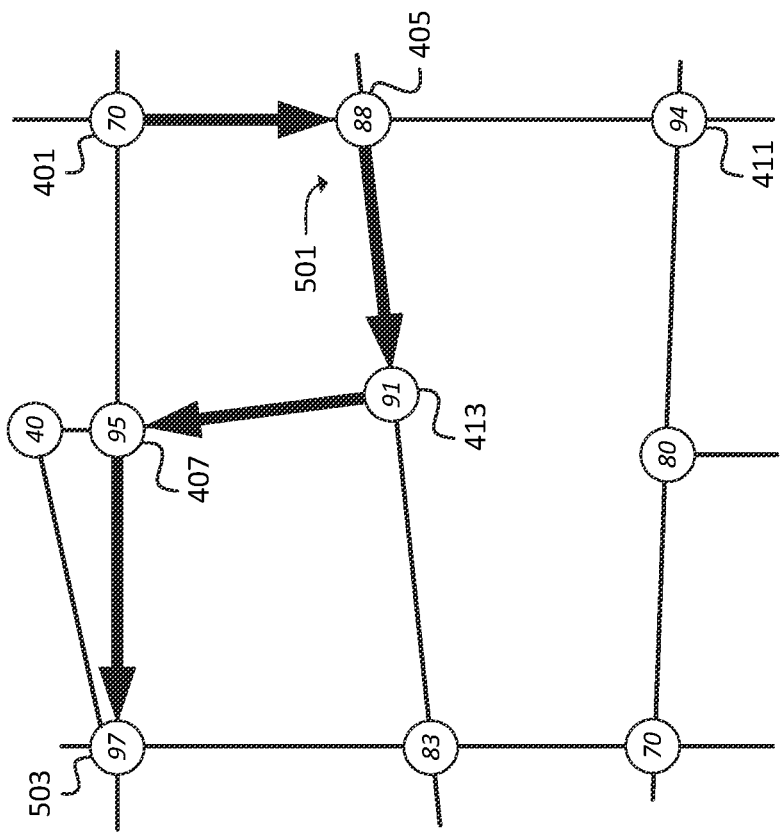

FIG. 5 illustrates other example search iterations with node 401 as the starting node, which may be performed as part of a precomputation (e.g., at 104) procedure performed by navigation system 101. These search iterations may be performed based on the same node map 300 based on which the example iteration shown in FIG. 4 is performed. As shown, for example, a second path 501 may be identified based on the search beginning at node 401, in ascending order of node priority. In this example, path 501 may include the same node 405 (and link 409) as the first traversal in path 403, but may include node 413 as the second traversal (e.g., instead of node 411 in the example of FIG. 4). Path 501 may further include nodes 407 and 503. For example, node 407 may be associated with a higher priority than the preceding node 413, and node 503 may be associated with a higher priority than the preceding node 407. Further, node 503 may be the end of path 501, as no additional nodes are available with a higher priority than the priority of node 503. Similarly, path 505, as further shown in FIG. 5, may include nodes 401, 407, and 503.

Figure 6:
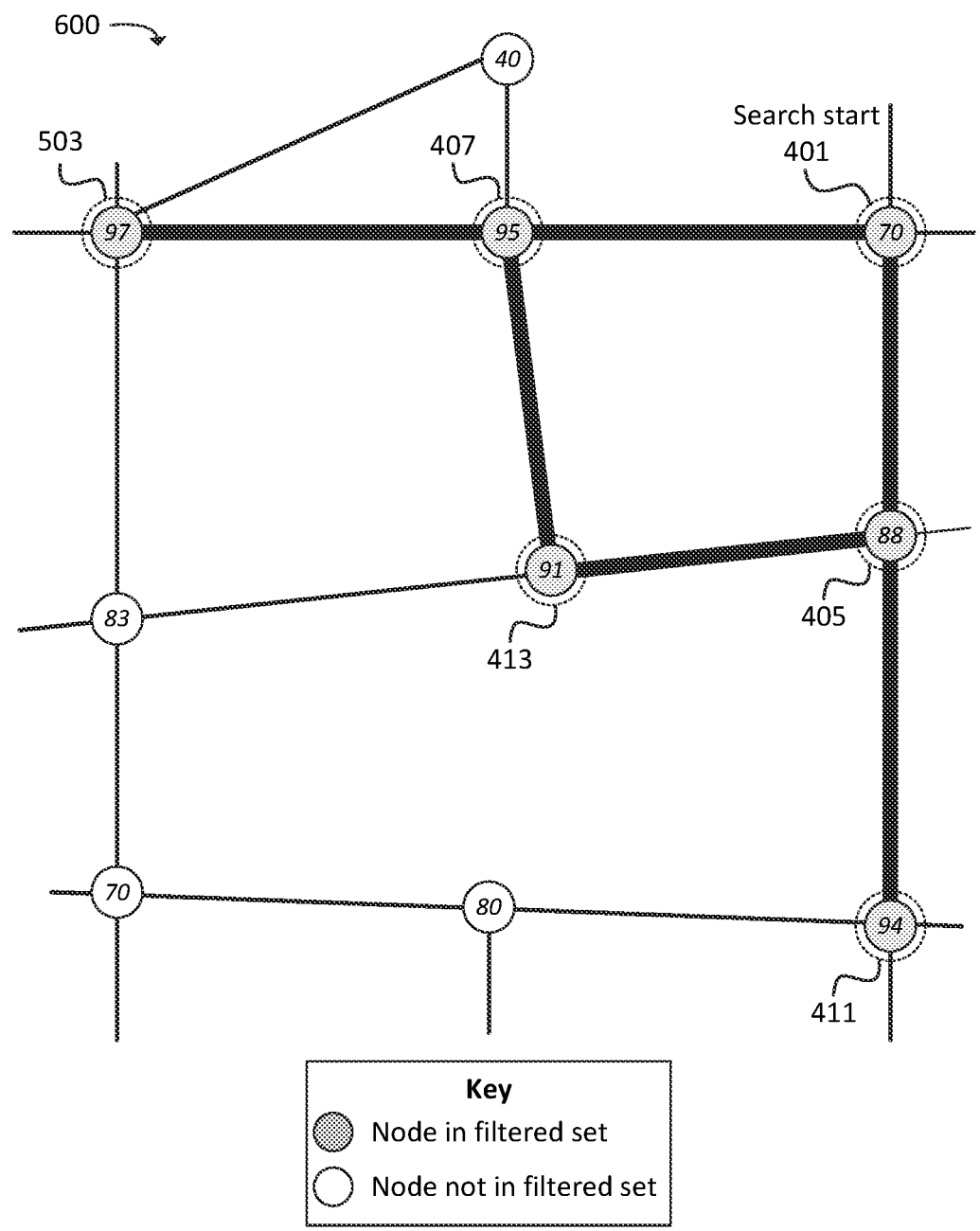
FIG. 6 illustrates an example filtered set of nodes associated with a particular starting node in the node map, in accordance with some embodiments.

FIG. 6 illustrates an example of the filtered set of nodes that may result from the iteration(s) of performing the search, starting from node 401, in ascending order of priority. For example, node map 600 may represent some or all of the nodes included in paths identified based on the search techniques described above (e.g., paths 403, 501, and 505). The filtered set of nodes, represented as gray circles in this figure and in other figures, may include nodes that are associated with links of paths 403, 501, and 505. For example, the filtered set of nodes, associated with starting node 401, may include nodes 405, 407, 411, 413, and 503. In some embodiments, the filtered set of nodes may further include the starting node itself (i.e., node 401, in this example). The filtered set of nodes may not include (e.g., may omit) other nodes of node maps 300 and/or 600, such as nodes that were not identified based on performing the iterations of the search from node 401 in ascending order of priority.

Returning to FIG. 1, the filtered set of nodes may be determined (at 104) by navigation system 101 as part of a "precompute" operation, which may be used in conjunction with a "query time" operation, as described below, in order to identify an optimal path from a given starting node to an ending node, as described below. Navigation system 101 may further receive (at 106) a navigation request or other type of request, indicating a starting location and a destination. The navigation request may be received from User Equipment ("UE") 105, which may include a mobile telephone, a vehicle infotainment system, a tablet computer, a laptop, or the like.

The starting location and/or destination may be specified as one or more addresses, sets of coordinates, and/or in some other suitable manner. Navigation system 101 may identify one or more candidate paths for the navigation request based on the filtered set of nodes (e.g., as determined at 104). The identification (at 106) of such one or more paths may include performing one or more searches (e.g., one or more forward searches) from a node that corresponds to the starting point of the navigation request.

As discussed below, the one or more forward searches may include an "ascending forward search" in which nodes are traversed in ascending order of priority and a "descending forward search" in which nodes, of the filtered set of nodes, are traversed in descending order of priority. For example, when the ascending forward search reaches a node in the filtered set of nodes, navigation system 101 may proceed with the descending forward search, traversing only nodes of the filtered set of nodes in descending order. In some embodiments, when the ascending forward search reaches a node in the filtered set of nodes, navigation system 101 may continue the ascending forward search without regard to whether nodes traversed in ascending order are in the filtered set of nodes.

Figure 7:
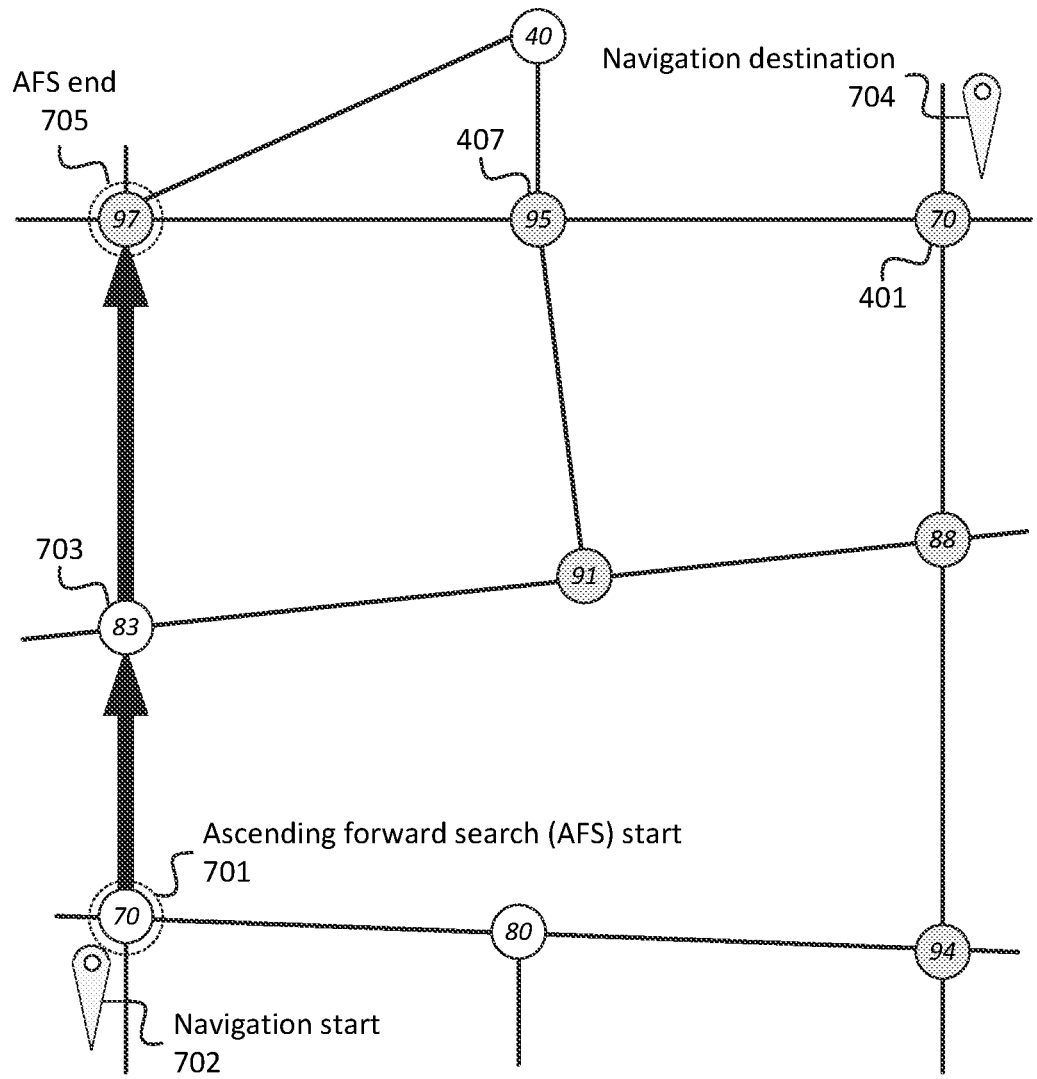
FIG. 7 illustrates an example of a search of nodes in the node map from a particular node, in ascending order of priority, stopping at a node in the filtered set of nodes, in accordance with some embodiments.

As shown in FIG. 7, node 701 may correspond to the starting point of the navigation request. Node 701 may be at, may be proximate to (e.g., within a threshold distance), may correspond to a nearest intersection, and/or may otherwise be associated with the starting point of the navigation request. For example, the navigation request may specify starting location 702 as a start of the search, and may specify destination 704 as a destination of the search. In some embodiments, a link from starting location 702 to node 701 may also be searched or determined in a similar fashion as described herein, and/or a link from node 401 to destination 704 may be searched or determined in a similar fashion. For example, starting location 702 may have a lower priority than node 701, and a destination 704 may have a lower priority than node 401. For the sake of simplicity, in the examples provided herein, a path that begins at node 701 and ends at node 401 will be considered as a path from starting location 702 to destination 704, even if nodes 701 and/or 401 do not necessarily correspond to exact locations of starting location 702 and/or destination 704.

As similarly discussed above with respect to the example search iterations shown in FIGS. 4 and 5, a particular path (e.g., determined by an iteration of the ascending forward search) starting at node 701 may include a sequence of nodes traversed in ascending order of priority, with the path ending when no nodes with a higher priority than the preceding node is available. In this example, the determined path may include nodes 703 and 705. As discussed above, node 705 may be the ending node for this path because no other nodes that are reachable from node 705 have a greater priority than node 705. In some embodiments, node 705 may be the ending node for this path because no other nodes that are reachable from node 705 have a priority that is greater than or equal to the priority of node 705.

Figure 8:
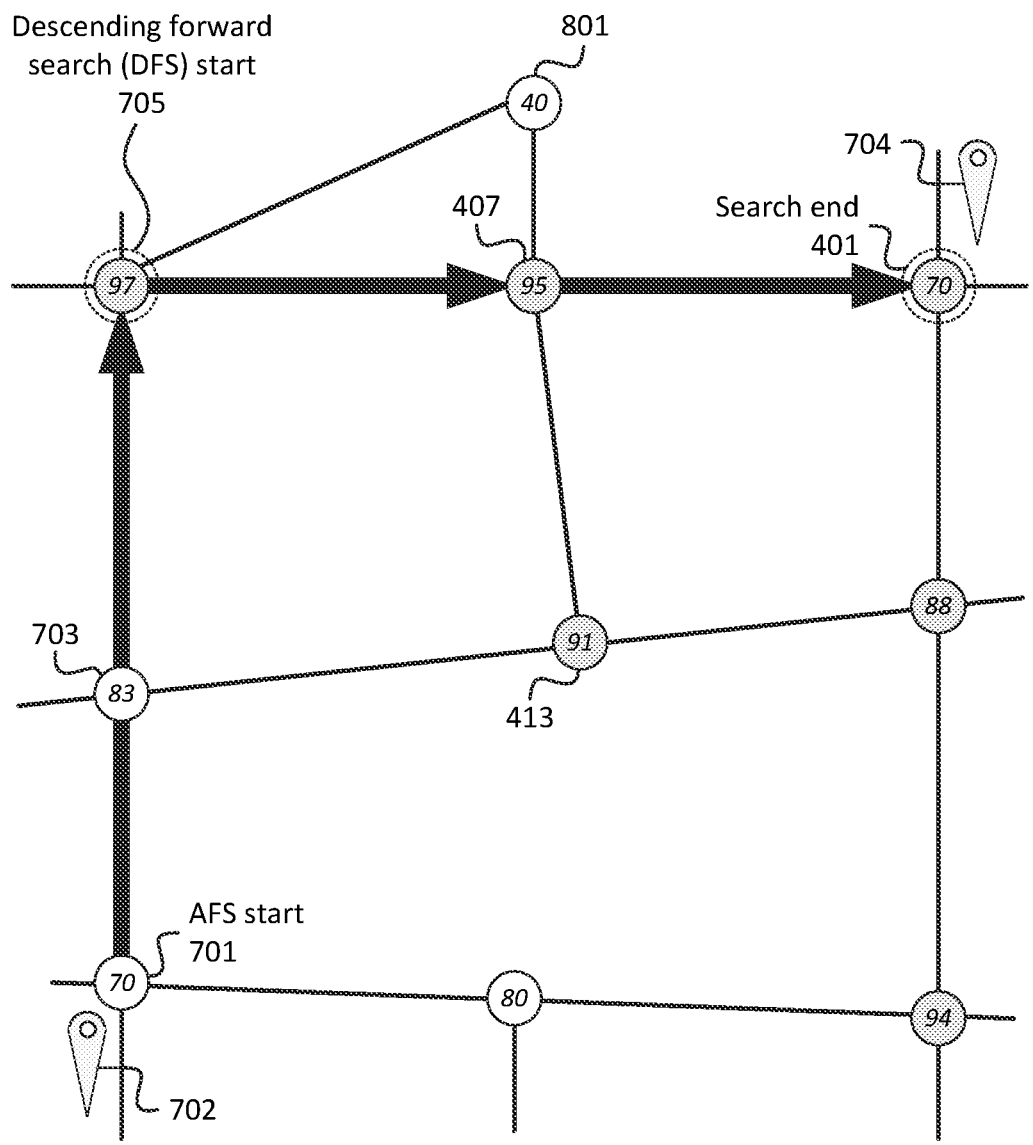
FIG. 8 illustrates a search of nodes in a node map from a particular node in the filtered set of nodes, in descending order of priority, stopping at a node based on which the filtered set was generated, in accordance with some embodiments.

Continuing with the example of FIG. 7 and as shown in FIG. 8, the forward search (e.g., from node 701 and/or starting location 702 to node 401 and/or destination 704) may continue after the forward search, in ascending order of priority from node 701, has concluded (e.g., no more traversals to higher priority nodes are available). As shown in FIG. 8, the descending forward search may continue from the ending node of the ascending forward search, namely node 705 in this example. Thus, node 705 may be both the ending node of the ascending forward search and the starting node of the descending forward search.

In accordance with some embodiments, the descending forward search may be restricted to nodes that are in the filtered set of nodes. For example, the descending forward search may omit nodes that are not in the filtered set of nodes. As noted above, the filtered set of nodes are shown again in FIG. 8 with gray shading. For example, while node 801 is reachable from node 705 and is a lower priority than node 705, node 801 may not be a candidate for traversal, as node 801 is not in the filtered set of nodes.

In this example, the descending forward search may include a traversal from node 705 to node 407, which is a lower priority than node 705 and is also in the filtered set of nodes. As similarly noted above, while node 801 is reachable from node 407 and is a lower priority than node 407, node 801 may not be a candidate for traversal, as node 801 is not in the filtered set of nodes. Thus, from node 407, nodes 401 and 413 may be candidates for traversal, as these nodes are a lower priority than node 407 and are in the filtered set of nodes. In this example, node 401 may be traversed from node 407.

Since node 401 has been previously determined as the node that is associated with destination 704 (e.g., the destination indicated in the navigation request), the path illustrated in FIG. 8 may be considered as a "complete" solution that reaches destination 704 from starting location 702. That is, the path that includes nodes 701, 703, 705, 407, and 401 may be or may be included in a complete solution from destination 704 to starting location 702.

Figure 9A:
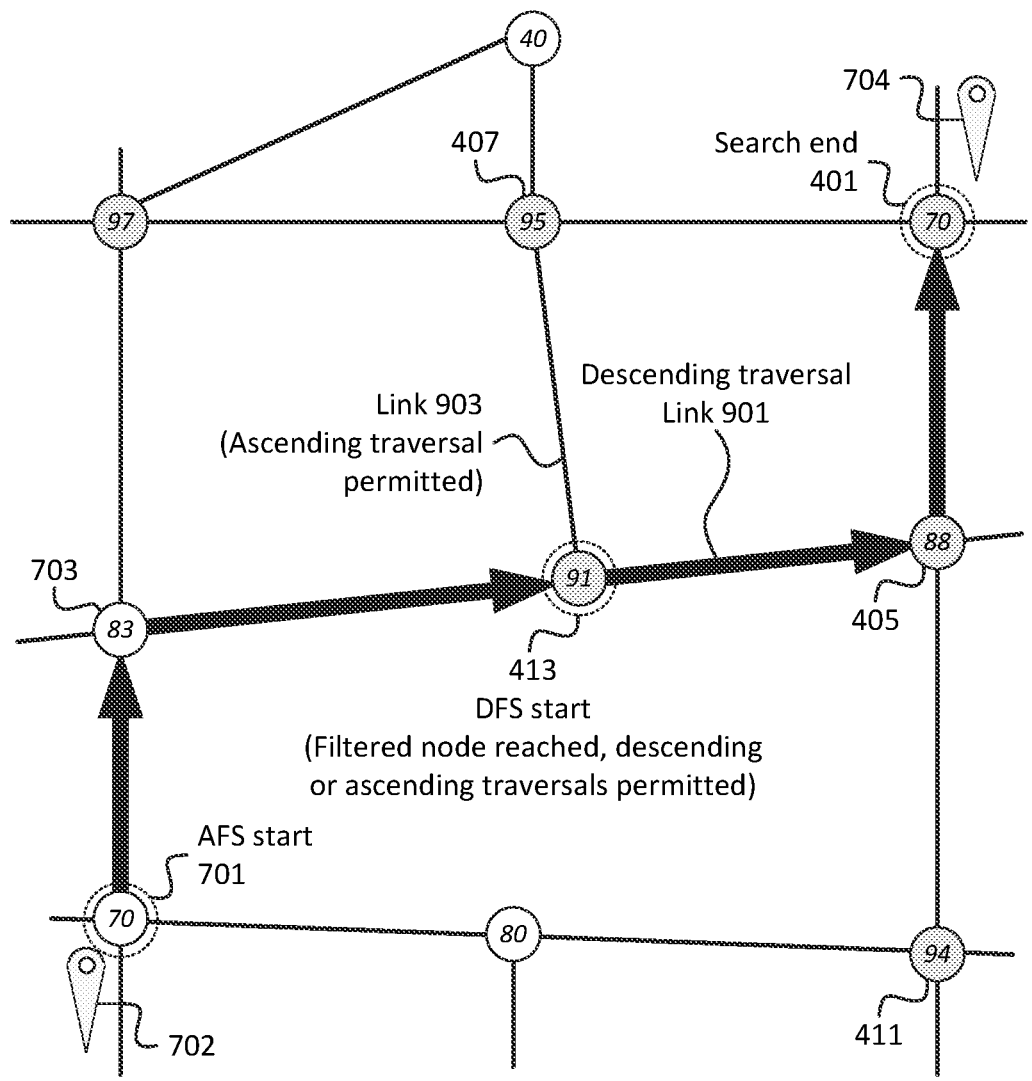
FIGS. 9A-9C illustrate examples of other iterations of the example searches depicted in FIGS. 7 and 8, in accordance with some embodiments.

FIG. 9A illustrates another iteration of the ascending forward search (e.g., in order of ascending node priority) and the descending forward search (e.g., in descending order of descending priority). As shown, this iteration of the ascending forward search may include identifying nodes 701, 703, and 413. Further, as node 413 is in the filtered set of nodes, the descending forward search may begin, in accordance with some embodiments. For example, node 405 may be traversed from node 413 (e.g., via link 901), as node 405 is associated with a lower node priority than node 413.

In some embodiments, when node 413 is reached, nodes in ascending priority may still be traversed. That is, reaching a node that is in the filtered set of nodes does not, in some embodiments, cause the ascending forward search to cease. Nodes may continue to be traversed in ascending order of priority once a node in the filtered set is reached. In some embodiments, when the descending forward search begins, no node may be traversed in ascending order of priority (e.g., once a node with lower priority than a preceding node has been traversed). In some embodiments, once a node in the filtered set of nodes has been reached in the descending forward search, the only candidates for traversal may be nodes of the filtered set, which have a lower priority than the preceding node.

Figure 9B:
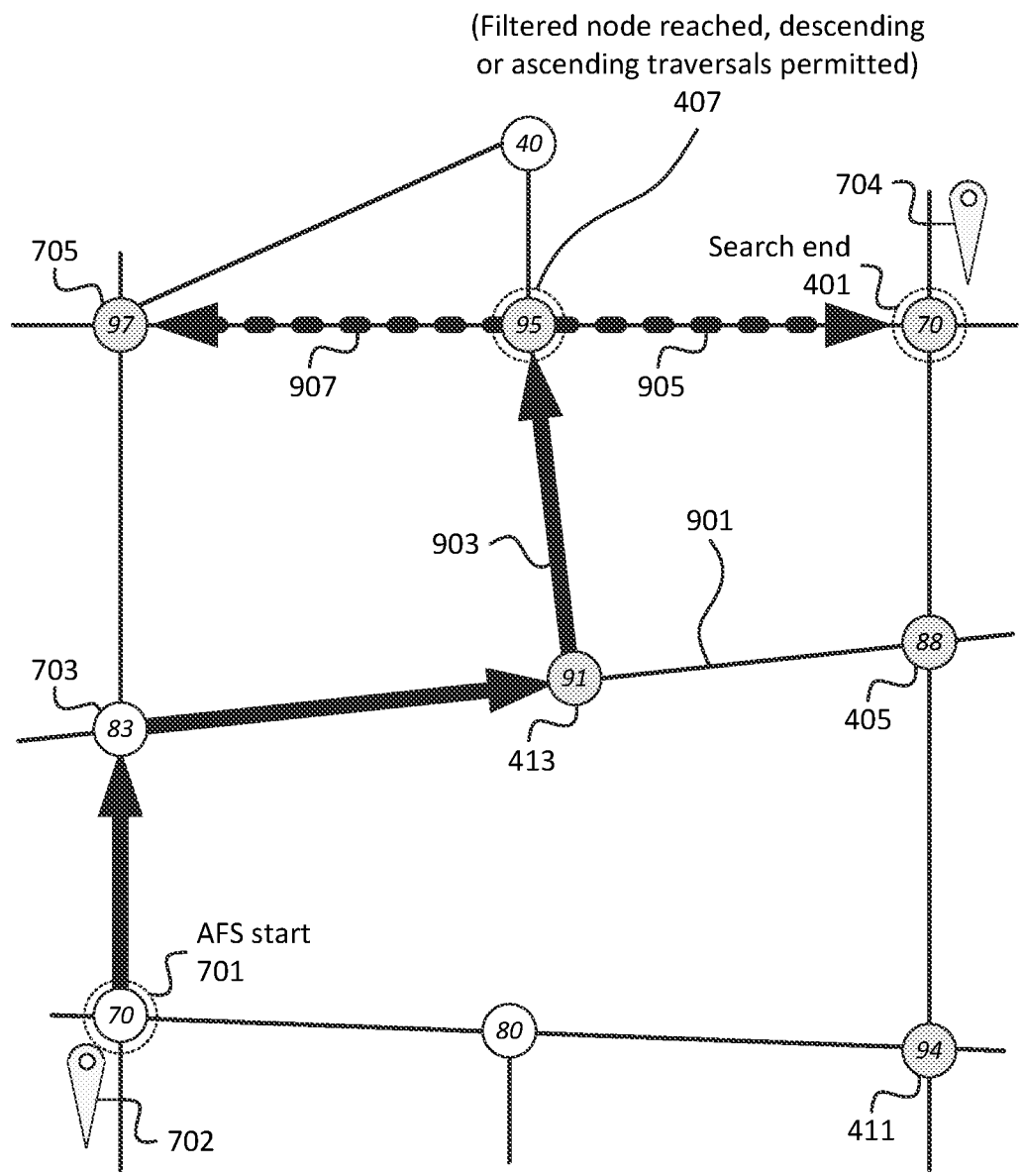
Figure 9C:
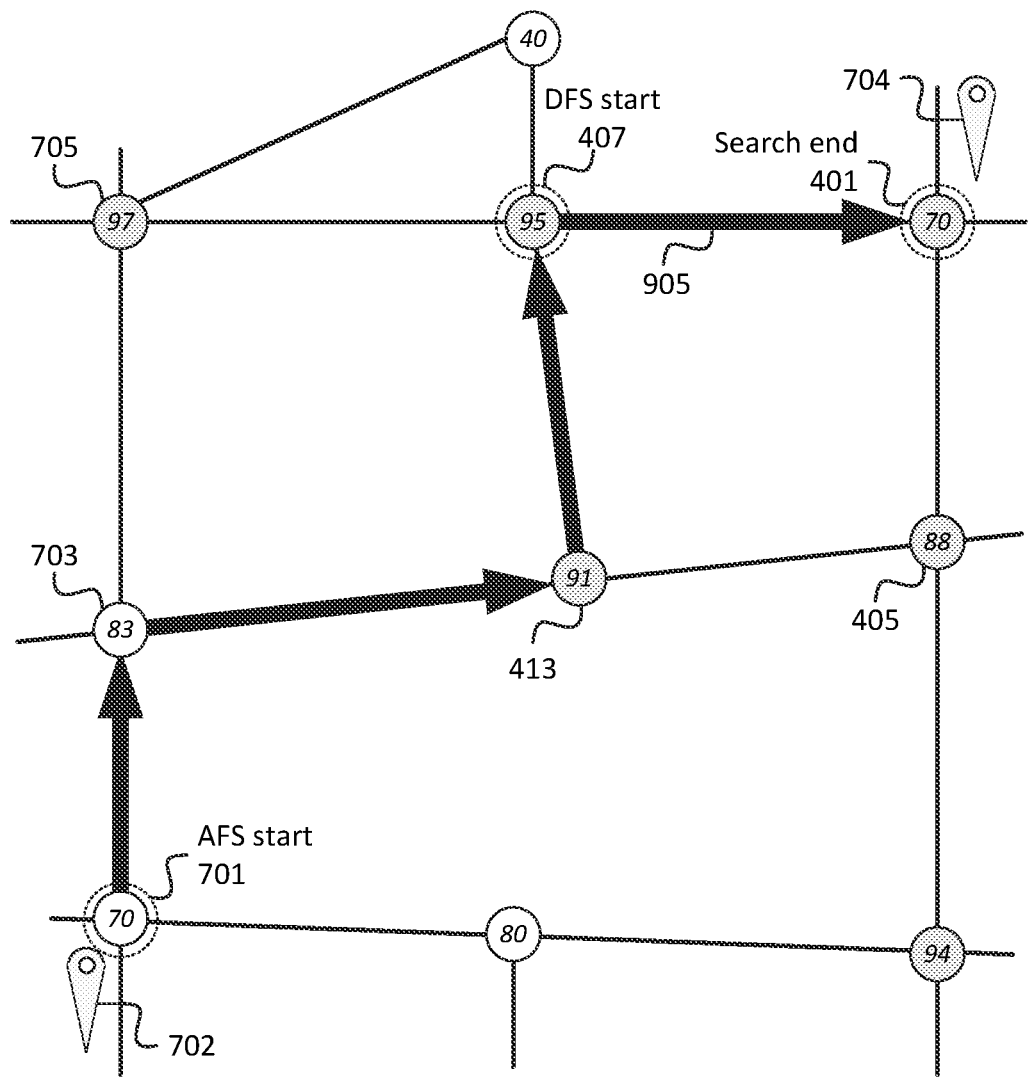

While the example of FIG. 9A shows an iteration in which node 405 is traversed (e.g., a descending traversal of a node in the filtered set of nodes) from node 413, FIG. 9B shows an iteration in which node 407 is traversed from node 413 (e.g., an ascending traversal). As further shown in FIG. 9B, once node 407 is reached, the ascending forward search may continue to node 705, or the descending forward search may begin by traversing to node 401. For example, as shown in FIG. 9C, a complete path may include a traversal of link 905, from node 407 to node 401.

Figure 9D:
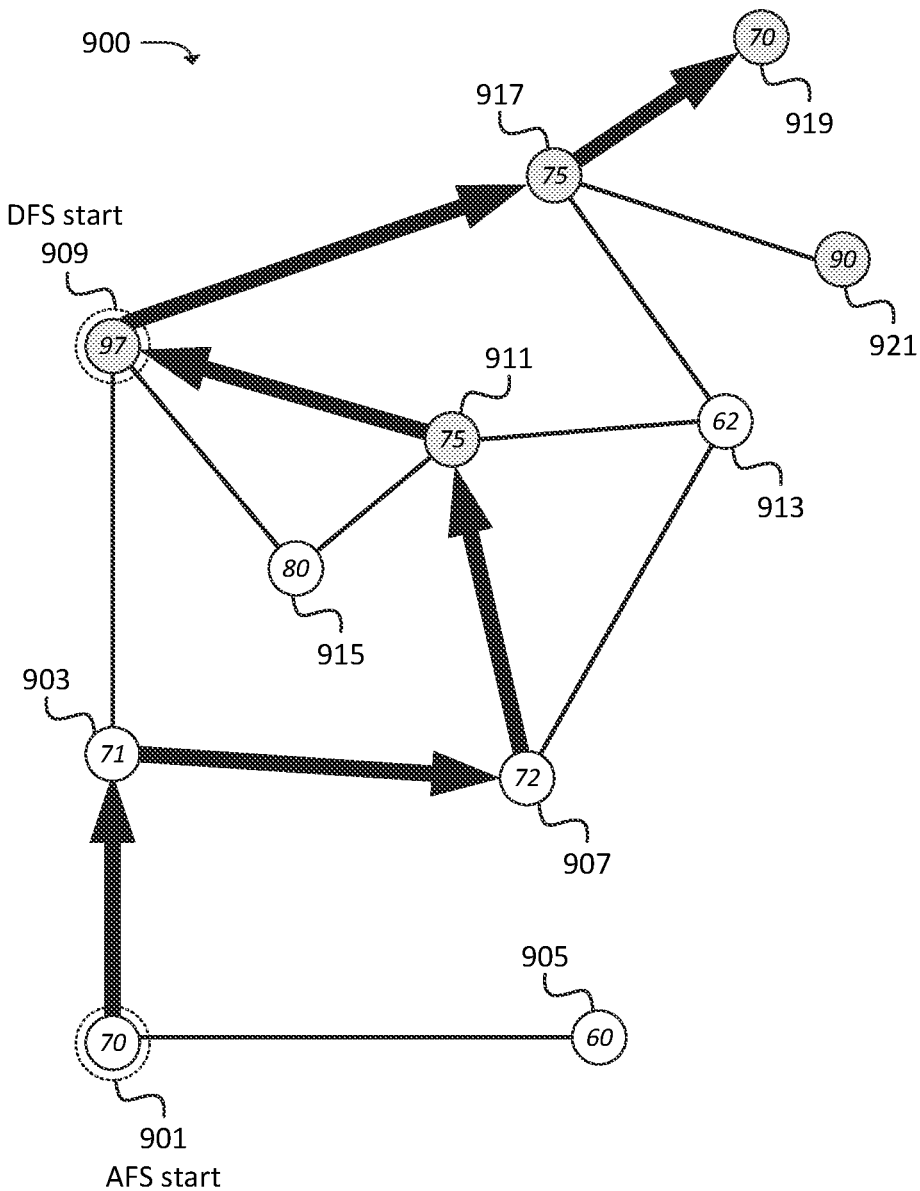
FIG. 9D illustrates examples of traversals between nodes that may be made in accordance with an ascending forward search and/or a descending forward search, in accordance with some embodiments.

FIG. 9D further illustrates some of these concepts with respect to a node map 900. Of the nodes in node map 900, assume that nodes 909, 911, 917, 919, and 921 are in a filtered set of nodes (e.g., as determined similar to the examples described above). Further assume that node 901 is a starting node of an ascending forward search. As shown, the ascending forward search may include a traversal to node 903, as node 903 is associated with a higher priority than node 901. A traversal to node 905 may not be permissible in the ascending forward search (e.g., node 905 may not be a candidate for traversal in this situation), as node 905 has a lower priority than node 901.

From node 903, nodes 907 and 909 may be candidates for traversal, as nodes 907 and 909 both are associated with higher priorities than node 903. In this iteration, node 907 may be traversed from node 903; in other iterations, node 909 may be traversed from node 903. In some embodiments, node 901 may not be a candidate for traversal from node 903, as node 901 has already been traversed in this search.

From node 907, node 911 may be a candidate for traversal based on its higher priority than node 907. Further, node 913 may not be a candidate for traversal based on its lower priority than node 907. In this iteration, node 911 may be traversed from node 907.

From node 911, nodes 909 and 915 may be candidates for traversal, as nodes 909 and 915 have a higher priority than node 911. That is, although node 911 is in the filtered set of nodes, beginning to search in descending order is not required, in accordance with some embodiments. Further, although node 911 is in the filtered set of nodes, traversing another node of the filtered set of nodes is not required in some embodiments. Node 913 may not be a candidate for traversal from node 911, as node 913 has a lower priority than node 911 and is not in the filtered set of nodes. In this iteration, node 909 may be traversed from node 911; in other iterations, node 915 may be traversed from node 911.

From node 909, the descending forward search may start, in this example. For example, from node 909, node 917 may be a candidate for traversal, as node 917 is in the filtered set of nodes and has a lower priority than node 909. Nodes 903 and 915 may not be candidates for traversal from node 909, as these nodes are not in the filtered set of nodes, and because these nodes have a lower priority than node 909. In this iteration, node 917 may be traversed from node 909.

From node 917, node 919 may be a candidate for traversal, as node 919 has a lower priority than node 917 and is in the filtered set of nodes. Node 921 may not be a candidate for traversal in this situation, even though node 921 is in the filtered set of nodes. For example, in some embodiments, since node 917 has been reached as part of the descending forward search (e.g., node 917 has a lower priority than the node from which node 917 was reached), node 921 may not be a candidate for traversal from node 917 because node 921 has a higher priority than node 917.

Further, node 913 may node be a candidate for traversal from node 917, even though node 913 has a lower priority than node 917, because node 913 is not in the filtered set of nodes.

Figure 10:
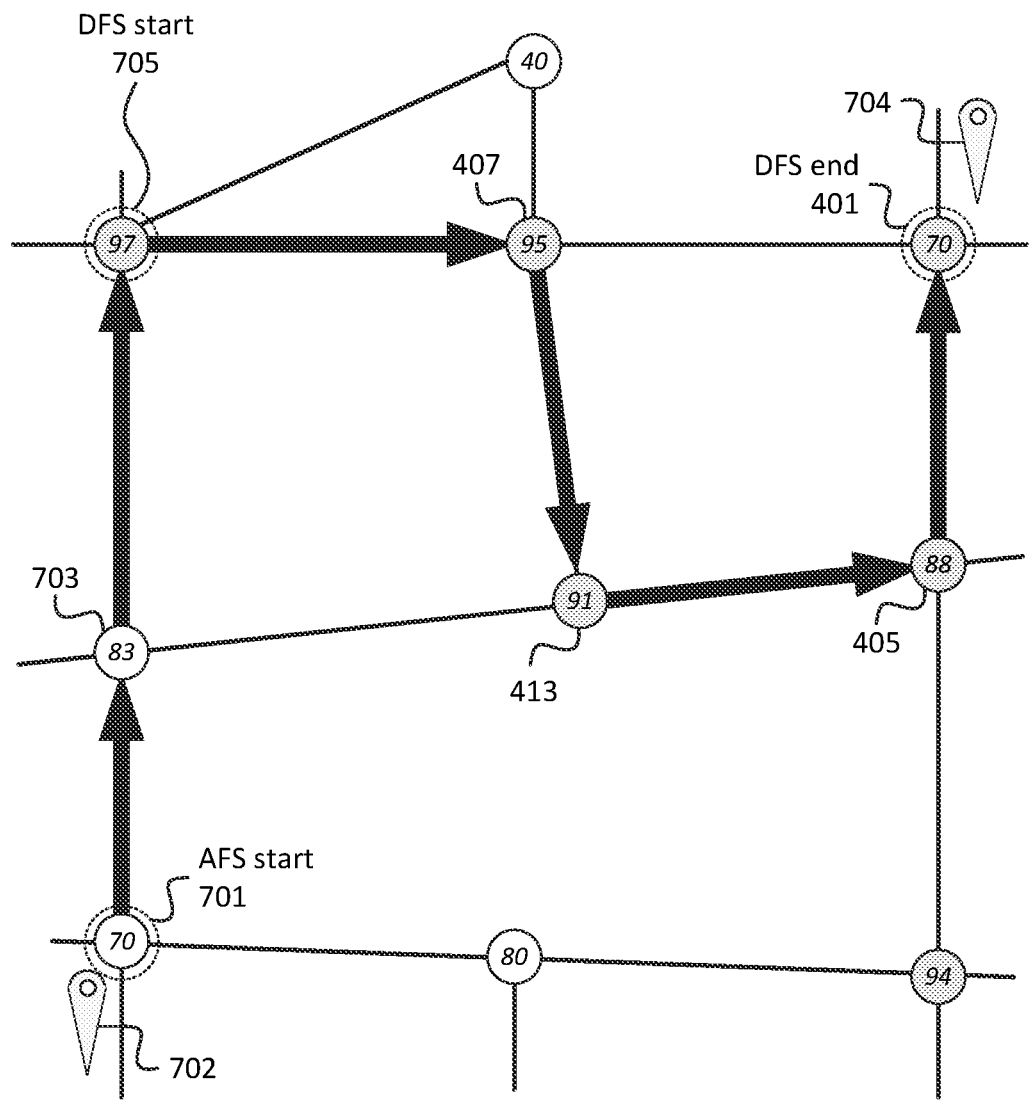
FIG. 10 illustrates an example of another iteration of the example searches depicted in FIGS. 7 and 8, in accordance with some embodiments.

FIG. 10 illustrates yet another illustration of the ascending forward search and descending forward search with node 701 as the starting node and node 401 as the ending node. The descending forward search, in this iteration, may begin at the same ending node (i.e., node 705) as the example iteration shown in FIG. 8. This iteration may further include traversing nodes 407, 413, 405, and 401, as these nodes are associated with successively lesser priorities and are in the filtered set of nodes.

Figure 11:
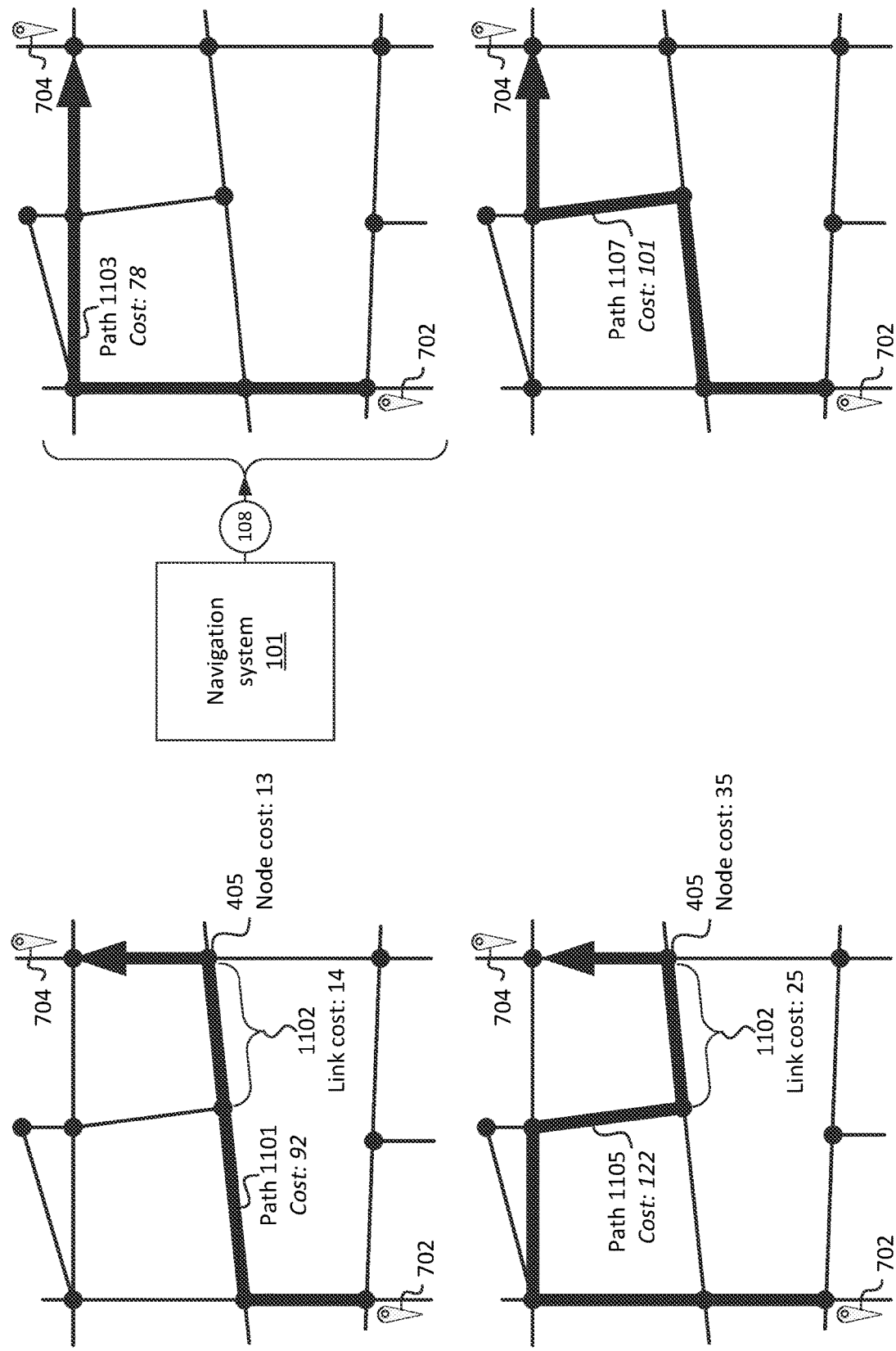
FIG. 11 illustrates an example determination of path costs associated with paths determined by performing a set of searches, in accordance with some embodiments.

As shown in FIG. 11, and as mentioned in FIG. 1, navigation system 101 may select (at 108) a particular candidate path, from a set of candidate paths, based on costs associated with the candidate paths. For example, the set of candidate paths may include the "complete" solutions identified from the starting node (e.g., node 701) to the ending node (e.g., node 401) associated with the navigation request. For example, path 1101 may correspond to the example solution shown in FIG. 8, path 1103 may correspond to the example solution shown in FIG. 9A, path 1105 may correspond to the example solution shown in FIG. 10, and path 1107 may correspond to the example solution shown in FIG. 9C.

Navigation system 101 may identify costs associated with each path. In some embodiments, cost information (e.g., associated with each node and/or link) may be received (e.g., at 102) from road information repository 103 or some other device or system. Additionally, or alternatively, navigation system 101 may determine costs for each path and/or for components thereof (e.g., nodes and/or links associated with each path). As noted above, costs may refer to travel time, fuel consumption, and/or other suitable factors. In some embodiments, costs may vary over time. For example, although paths 1101 and 1105 both include link 1102 and node 405, link 1102 and/or node 405 may be associated with different costs for these paths because preceding links of these paths may be associated with different durations of time. Thus, leaving starting location 702 at a first time and traveling along path 1101 would result in reaching node 405 at a second time (and thus, node 405 is associated with a first cost at this second time), while leaving starting location 702 at the same first time and traveling along path 1105 would result in reaching node 405 at a third time (and thus, node 405 is associated with a second cost at this third time).

As another example, leaving starting location 702 at a first time and traveling along path 1101 would result in traversing link 1102 at a second time (and thus, link 1102 is associated with a first cost at this second time), while leaving starting location 702 at the same first time and traveling along path 1105 would result in traversing link 1102 at a third time (and thus, link 1102 is associated with a second cost at this third time).

Ultimately, in the example of FIG. 11, navigation system 101 may select (at 108) path 1103, as path 1103 may have the lowest overall cost out of the candidate set of paths that includes paths 1101, 1103, and 1105. Returning to FIG. 1, navigation system 101 may provide (at 110) a navigation response to UE 107 with the selected path. Additionally, or alternatively, navigation system 101 may provide (at 110) a navigation response to UE 107 with multiple candidate paths, along with an indication of a total cost, score, ranking, etc. associated with each provided candidate path. For example, navigation system 101 may provide (at 110) a navigation response indicating that path 1103 is a highest ranking path, that path 1101 is a second-highest ranking path, and/or that path 1105 is a third-highest and/or lowest ranking path. UE 107 may present one or more of these paths to a user of UE 107, such as overlaying one or more of the paths on a map, providing turn-by-turn instructions, or the like. In some embodiments, UE 107 may include or may be coupled to an autonomous or semi-autonomous vehicle, which may follow a particular provided path in order to reach the destination.

Figure 12:
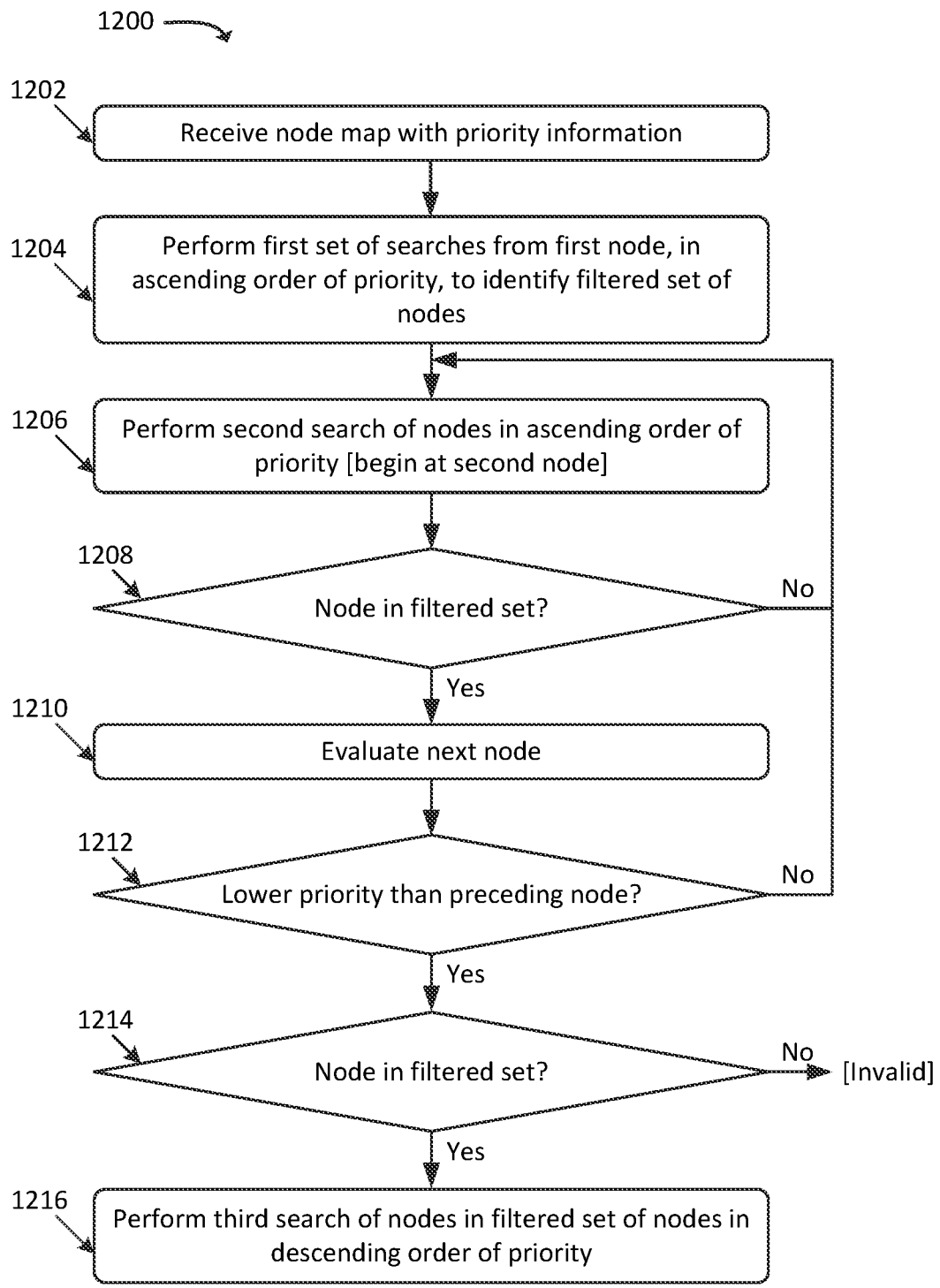
FIG. 12 illustrates an example process for identifying one or more paths between a starting node and an ending node in a node map, in accordance with some embodiments.

FIG. 12 illustrates an example process 1200 for identifying one or more paths between a starting node and an ending node in a node map. As discussed above, the starting node may be associated with a starting location associated with a navigation request, and the ending node may be associated with a destination associated with a navigation request. As further described above, portions of process 1200 may correspond to a "precomputation" operation (e.g., prior to receiving the navigation request), while other portions of process 1200 may correspond to a "query time" operation (e.g., after receiving the navigation request). In some embodiments, some or all of process 1200 may be performed by navigation system 101. In some embodiments, one or more other devices may perform some or all of process 1200 in concert with, and/or in lieu of, navigation system 101, such as road information repository 103 and/or some other device or system.

As shown, process 1200 may include receiving a node map with priority information (at 1202). For example, as discussed above, navigation system 101 may receive road information based on which navigation system 101 may generate a node map, and/or may receive a node map. Each node may represent one or more roads, intersections, shortcuts associated with a contraction hierarchy, or other suitable features or attributes. Navigation system 101 may determine, or receive information indicating, priorities (or other types of scores, metrics, importance, etc.) associated with each node of the node map.

Process 1200 may further include performing (at 1204) a first set of searches from a first node in the node map, in ascending order of priority, to identify a filtered set of nodes. For example, as discussed above, navigation system 101 may perform a "precomputation" operation with respect to one or more nodes of the node map to identify a filtered set of nodes associated with each one of the one or more nodes.

Process 1200 may additionally include performing (at 1206) a second search from a second node, in ascending order of priority. For example, the second search may be a "query time" search performed based on a navigation request that specifies the second node (or a location associated with the second node) as a starting location. Additionally, or alternatively, the second search may be performed as a "precomputation" operation that is performed independently of any requests. The second search may include traversing nodes, in the node map, in ascending order of priority. A first instance of operation 1206 may include starting at the second node. As the second search progresses, as described herein, operation 1206 may refer to other nodes that are reached by way of traversing nodes in ascending order. As a result of performing operation 1206, a third node may be reached from the second node, a fourth node may be reached from the second node, and so on (e.g., where the third node has a higher priority than the second node, where the fourth node has a higher priority than the third node, and so on).

Process 1200 may include determining (at 1208) whether a particular node reached by way of the ascending forward search is in the filtered set of nodes, identified at 1204 (e.g., a "next" node traversed from a "preceding" node via operation 1206). If this node is not in the filtered set of nodes (at 1208—NO), process 1200 may return to operation 1206 (e.g., may continue the ascending forward search).

If, on the other hand, the node is in the filtered set of nodes (at 1208—YES), then process 1200 may include further evaluating (at 1210) a next node (e.g., after the node evaluated at operation 1208). The evaluation may indicate whether this next node is a candidate for traversal in this situation. For example, if this next node is a lower priority node than the preceding node from which this next node was traversed (at 1212—NO), then this node may be a valid candidate for traversal (e.g., this node may be traversed in accordance with the ascending search), and process 1200 may return to operation 1206. Returning to operation 1206 may continue the second search in ascending order of priority.

If the next node is a lower priority node (e.g., is a higher priority node) than the preceding node (at 1212—YES), then process 1200 may include determining (at 1214) whether the next node is in the filtered set. If this next node is a lower priority than the previous node and is not in the filtered set of nodes (at 1212—YES and 1214—NO), then this next node may not be a candidate for traversal. A similar example to this situation is shown in FIG. 9D. For example, as discussed above, node 913 may not be a candidate for traversal from node 911, as node 913 has a lower priority than node 911 but is not in the filtered set of nodes.

If, on the other hand, the next node is a lower priority node than the preceding node and is in the filtered set of nodes (at 1212—YES and 1214—YES), then process 1216 may include performing a third search of nodes, of the filtered set of nodes, in descending order of priority. That is, since a node in the filtered set with a lower priority than the preceding node has been traversed, the search may continue traversing nodes with a lower priority than the preceding node, which are also in the filtered set of nodes.

As noted above, some or all of the operations discussed above may be performed and/or repeated iteratively. For example, the first set of searches (at 1204) may be performed for multiple nodes in the node map, in order to identify a respective filtered set of nodes associated with each node of the multiple nodes. Operations 1206-1214 may be performed multiple times in order to identify multiple paths from the second node to one or more nodes of the filtered set of nodes. The third search (at 1216) may be performed multiple times in order to identify multiple paths, via the filtered set of nodes and in descending order of priority, to the first node.

Figure 13:
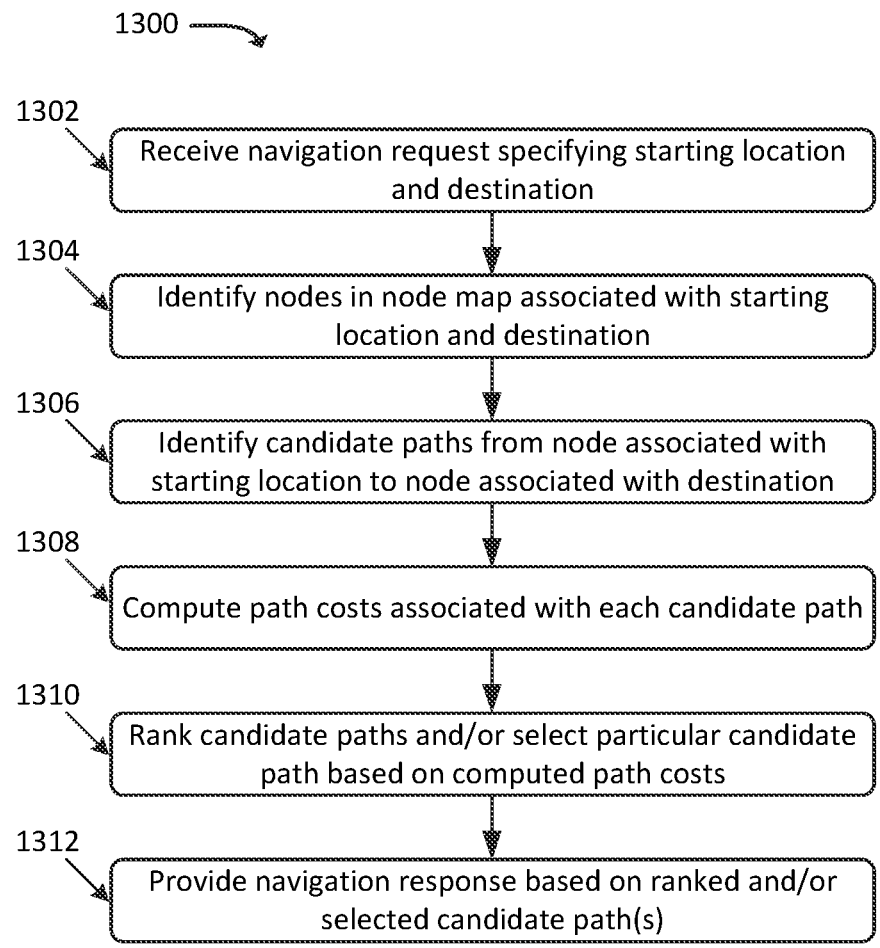
FIG. 13 illustrates an example process for responding to a navigation request with one or more paths.

FIG. 13 illustrates an example process 1300 for responding to a navigation request with one or more paths determined using techniques described above (e.g., based on performing one or more iterations of the first search, second search, and/or third search). In some embodiments, some or all of process 1300 may be performed by navigation system 101. In some embodiments, one or more other devices may perform some or all of process 1300 in concert with, and/or in lieu of, navigation system 101, such as road information repository 103 and/or one or more other devices or systems.

As shown, process 1300 may include receiving (at 1302) a navigation request specifying a starting location and a destination. For example, navigation system 101 may receive such a request from UE 107 and/or some other device or system.

Process 1300 may further include identifying (at 1304) nodes in a node map that are associated with the starting location and the destination. For example, as discussed above navigation system 101 may identify respective nodes in the node map that are at or are within a threshold proximity of the starting location and the destination, nodes that are reachable from the starting location and the destination, etc.

Process 1300 may additionally include identifying (at 1306) candidate paths from the node associated with the starting location to the node associated with the destination. For example, navigation system 101 may identify one or more paths generated according to techniques described above (e.g., as described above with respect to process 1200 and/or other techniques described above) that start at the node associated with the starting location and end at the node associated with the destination.

Process 1300 may also include computing (at 1308) path costs associated with each candidate path. For example, navigation system 101 may use artificial intelligence/machine learning ("AI/ML") techniques, models, or the like in order to identify the path costs. The costs may include costs that vary based on different paths taken, such as time-varying costs associated with travel time, fuel consumption, etc. For example, as noted above, the same node or link may be associated with different costs in different circumstances, such as different times at which a vehicle or user begins traversing the node or link.

Process 1300 may further include ranking the candidate paths and/or selecting (at 1310) a particular candidate path based on the computed costs. For example, navigation system 101 may rank the candidate paths according to the path costs associated with each candidate path. Navigation system 101 may select one or more of the candidate paths with costs that are below a threshold cost, may select a predetermined quantity of candidate paths with the lowest costs, may select a single one of the candidate path with the lowest cost, and/or may otherwise identify or select one or more of the candidate paths.

Process 1300 may additionally include providing (at 1312) a navigation response based on the ranked and/or selected candidate paths. For example, navigation system 101 may provide navigation directions and/or may otherwise provide information regarding the one or more selected paths to UE 107, from which the navigation request was received.

Figure 14:
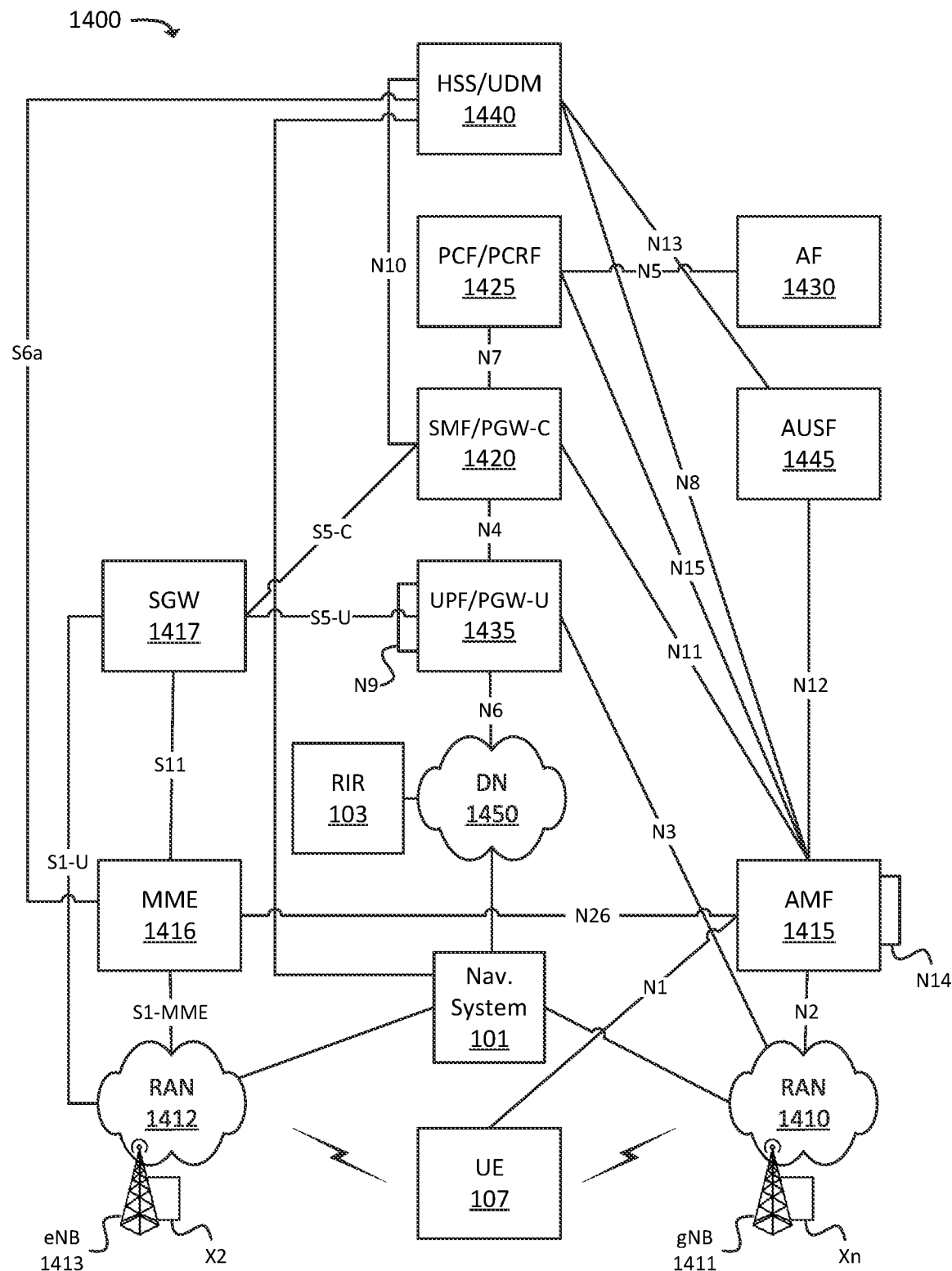
FIG. 14 illustrates an example environment in which one or more embodiments, described herein, may be implemented.

FIG. 14 illustrates an example environment 1400, in which one or more embodiments may be implemented. In some embodiments, environment 1400 may include and/or may be communicatively coupled to network 105. In some embodiments, environment 1400 may correspond to a Fifth Generation ("5G") network, and/or may include elements of a 5G network. In some embodiments, environment 1400 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1400 may include UE 107, RAN 1410 (which may include one or more Next Generation Node Bs ("gNBs") 1411), RAN 1412 (which may include one or more one or more evolved Node Bs ("eNBs") 1413), and various network functions such as Access and Mobility Management Function ("AMF") 1415, Mobility Management Entity ("MME") 1416, Serving Gateway ("SGW") 1417, Session Management Function ("SMF")/Packet Data Network ("PDN") Gateway ("PGW")-Control plane function ("PGW-C") 1420, Policy Control Function ("PCF")/Policy Charging and Rules Function ("PCRF") 1425, Application Function ("AF") 1430, User Plane Function ("UPF")/PGW-User plane function ("PGW-U") 1435, Home Subscriber Server ("HSS")/Unified Data Management ("UDM") 1440, and Authentication Server Function ("AUSF") 1445. Environment 1400 may also include one or more networks, such as Data Network ("DN") 1450. Environment 1400 may include one or more additional devices or systems communicatively coupled to one or more networks (e.g., DN 1450), such as navigation system 101 and/or road information repository 103, which may perform one or more operations described above.

The example shown in FIG. 14 illustrates one instance of each network component or function (e.g., one instance of SMF/PGW-C 1420, PCF/PCRF 1425, UPF/PGW-U 1435, HSS/UDM 1440, and/or AUSF 1445). In practice, environment 1400 may include multiple instances of such components or functions. For example, in some embodiments, environment 1400 may include multiple "slices" of a core network, where each slice includes a discrete set of network functions (e.g., one slice may include a first instance of SMF/PGW-C 1420, PCF/PCRF 1425, UPF/PGW-U 1435, HSS/UDM 1440, and/or AUSF 1445, while another slice may include a second instance of SMF/PGW-C 1420, PCF/PCRF 1425, UPF/PGW-U 1435, HSS/UDM 1440, and/or AUSF 1445). The different slices may provide differentiated levels of service, such as service in accordance with different Quality of Service ("QoS") parameters.

The quantity of devices and/or networks, illustrated in FIG. 14, is provided for explanatory purposes only. In practice, environment 1400 may include additional devices and/or networks, fewer devices and/or networks, different devices and/or networks, or differently arranged devices and/or networks than illustrated in FIG. 14. For example, while not shown, environment 1400 may include devices that facilitate or enable communication between various components shown in environment 1400, such as routers, modems, gateways, switches, hubs, etc. Alternatively, or additionally, one or more of the devices of environment 1400 may perform one or more network functions described as being performed by another one or more of the devices of environment 1400. Devices of environment 1400 may interconnect with each other and/or other devices via wired connections, wireless connections, or a combination of wired and wireless connections. In some implementations, one or more devices of environment 1400 may be physically integrated in, and/or may be physically attached to, one or more other devices of environment 1400.

UE 107 may include a computation and communication device, such as a wireless mobile communication device that is capable of communicating with RAN 1410, RAN 1412, and/or DN 1450. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 107 may send traffic to and/or receive traffic (e.g., user plane traffic) from DN 1450 via RAN 1410, RAN 1412, and/or UPF/PGW-U 1435.

RAN 1410 may be, or may include, a 5G RAN that includes one or more base stations (e.g., one or more gNBs 1411), via which UE 107 may communicate with one or more other elements of environment 1400. UE 107 may communicate with RAN 1410 via an air interface (e.g., as provided by gNB 1411). For instance, RAN 1410 may receive traffic (e.g., voice call traffic, data traffic, messaging traffic, signaling traffic, etc.) from UE 107 via the air interface, and may communicate the traffic to UPF/PGW-U 1435, and/or one or more other devices or networks. Similarly, RAN 1410 may receive traffic intended for UE 107 (e.g., from UPF/PGW-U 1435, AMF 1415, and/or one or more other devices or networks) and may communicate the traffic to UE 107 via the air interface.

RAN 1412 may be, or may include, a LTE RAN that includes one or more base stations (e.g., one or more eNBs 1413), via which UE 107 may communicate with one or more other elements of environment 1400. UE 107 may communicate with RAN 1412 via an air interface (e.g., as provided by eNB 1413). For instance, RAN 1410 may receive traffic (e.g., voice call traffic, data traffic, messaging traffic, signaling traffic, etc.) from UE 107 via the air interface, and may communicate the traffic to UPF/PGW-U 1435, and/or one or more other devices or networks. Similarly, RAN 1410 may receive traffic intended for UE 107 (e.g., from UPF/PGW-U 1435, SGW 1417, and/or one or more other devices or networks) and may communicate the traffic to UE 107 via the air interface.

AMF 1415 may include one or more devices, systems, Virtualized Network Functions ("VNFs"), etc., that perform operations to register UE 107 with the 5G network, to establish bearer channels associated with a session with UE 107, to hand off UE 107 from the 5G network to another network, to hand off UE 107 from the other network to the 5G network, manage mobility of UE 107 between RANs 1410 and/or gNBs 1411, and/or to perform other operations. In some embodiments, the 5G network may include multiple AMFs 1415, which communicate with each other via the N14 interface (denoted in FIG. 14 by the line marked "N14" originating and terminating at AMF 1415).

MME 1416 may include one or more devices, systems, VNFs, etc., that perform operations to register UE 107 with the EPC, to establish bearer channels associated with a session with UE 107, to hand off UE 107 from the EPC to another network, to hand off UE 107 from another network to the EPC, manage mobility of UE 107 between RANs 1412 and/or eNBs 1413, and/or to perform other operations.

SGW 1417 may include one or more devices, systems, VNFs, etc., that aggregate traffic received from one or more eNBs 1413 and send the aggregated traffic to an external network or device via UPF/PGW-U 1435. Additionally, SGW 1417 may aggregate traffic received from one or more UPF/PGW-Us 1435 and may send the aggregated traffic to one or more eNBs 1413. SGW 1417 may operate as an anchor for the user plane during inter-eNB handovers and as an anchor for mobility between different telecommunication networks or RANs (e.g., RANs 1410 and 1412).

SMF/PGW-C 1420 may include one or more devices, systems, VNFs, etc., that gather, process, store, and/or provide information in a manner described herein. SMF/PGW-C 1420 may, for example, facilitate the establishment of communication sessions on behalf of UE 107. In some embodiments, the establishment of communications sessions may be performed in accordance with one or more policies provided by PCF/PCRF 1425.

PCF/PCRF 1425 may include one or more devices, systems, VNFs, etc., that aggregate information to and from the 5G network and/or other sources. PCF/PCRF 1425 may receive information regarding policies and/or subscriptions from one or more sources, such as subscriber databases and/or from one or more users (such as, for example, an administrator associated with PCF/PCRF 1425).

AF 1430 may include one or more devices, systems, VNFs, etc., that receive, store, and/or provide information that may be used in determining parameters (e.g., quality of service parameters, charging parameters, or the like) for certain applications.

UPF/PGW-U 1435 may include one or more devices, systems, VNFs, etc., that receive, store, and/or provide data (e.g., user plane data). For example, UPF/PGW-U 1435 may receive user plane data (e.g., voice call traffic, data traffic, etc.), destined for UE 107, from DN 1450, and may forward the user plane data toward UE 107 (e.g., via RAN 1410, SMF/PGW-C 1420, and/or one or more other devices). In some embodiments, multiple UPFs 1435 may be deployed (e.g., in different geographical locations), and the delivery of content to UE 107 may be coordinated via the N9 interface (e.g., as denoted in FIG. 14 by the line marked "N9" originating and terminating at UPF/PGW-U 1435). Similarly, UPF/PGW-U 1435 may receive traffic from UE 107 (e.g., via RAN 1410, SMF/PGW-C 1420, and/or one or more other devices), and may forward the traffic toward DN 1450. In some embodiments, UPF/PGW-U 1435 may communicate (e.g., via the N4 interface) with SMF/PGW-C 1420, regarding user plane data processed by UPF/PGW-U 1435.

HSS/UDM 1440 and AUSF 1445 may include one or more devices, systems, VNFs, etc., that manage, update, and/or store, in one or more memory devices associated with AUSF 1445 and/or HSS/UDM 1440, profile information associated with a subscriber. AUSF 1445 and/or HSS/UDM 1440 may perform authentication, authorization, and/or accounting operations associated with the subscriber and/or a communication session with UE 107.

DN 1450 may include one or more wired and/or wireless networks. For example, DN 1450 may include an Internet Protocol ("IP")-based PDN, a wide area network ("WAN") such as the Internet, a private enterprise network, and/or one or more other networks. UE 107 may communicate, through DN 1450, with data servers, other UEs 107, and/or to other servers or applications that are coupled to DN 1450. DN 1450 may be connected to one or more other networks, such as a public switched telephone network ("PSTN"), a public land mobile network ("PLMN"), and/or another network. DN 1450 may be connected to one or more devices, such as content providers, applications, web servers, and/or other devices, with which UE 107 may communicate.

Figure 15:
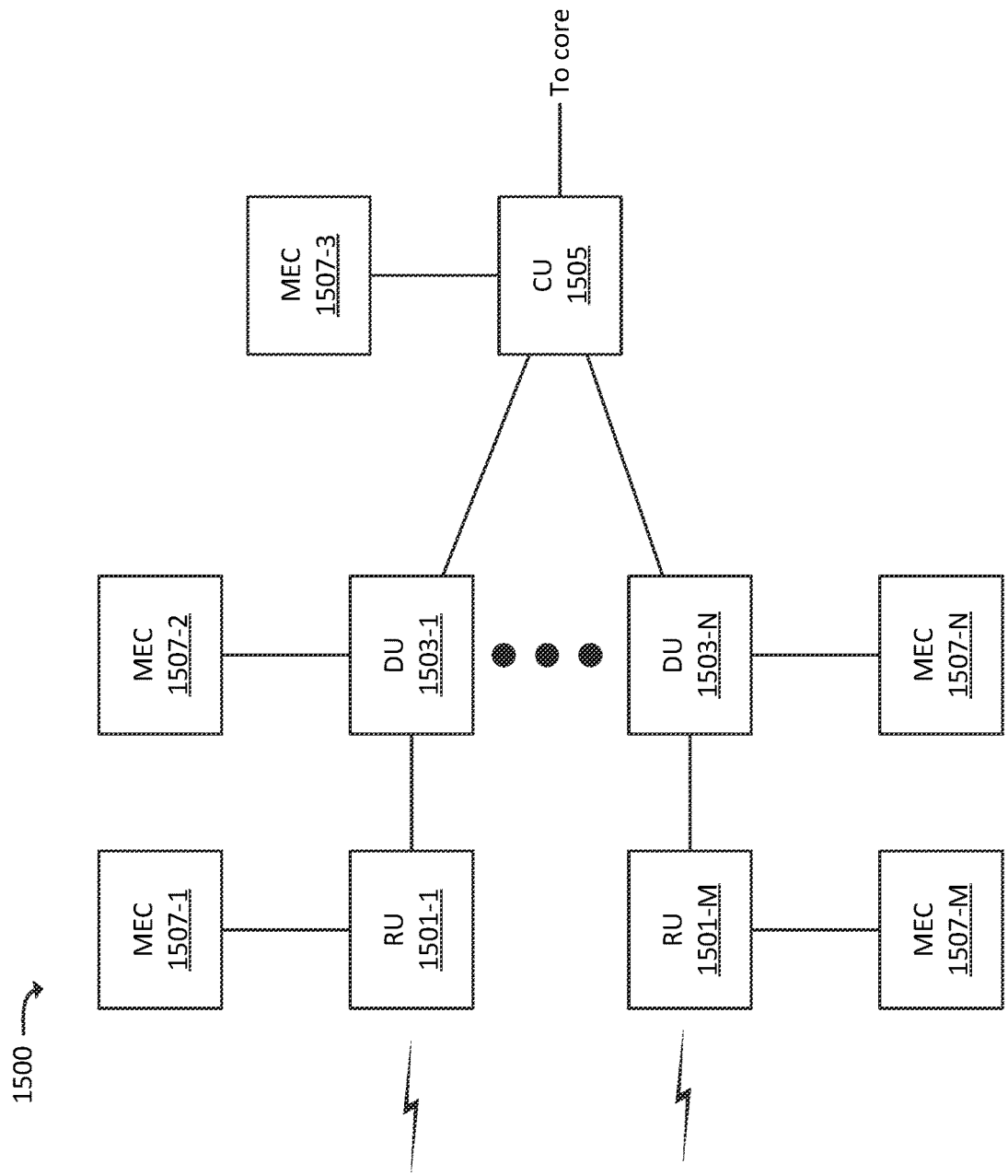
FIG. 15 illustrates an example arrangement of a radio access network ("RAN"), in accordance with some embodiments.

FIG. 15 illustrates an example Distributed Unit ("DU") network 1500, which may be included in and/or implemented by one or more RANs (e.g., RAN 1410, RAN 1412, or some other RAN). In some embodiments, a particular RAN may include one DU network 1500. In some embodiments, a particular RAN may include multiple DU networks 1500. In some embodiments, DU network 1500 may correspond to a particular gNB 1411 of a 5G RAN (e.g., RAN 1410). In some embodiments, DU network 1500 may correspond to multiple gNBs 1411. In some embodiments, DU network 1500 may correspond to one or more other types of base stations of one or more other types of RANs. As shown, DU network 1500 may include Central Unit ("CU") 1505, one or more Distributed Units ("DUs") 1503-1 through 1503-N (referred to individually as "DU 1503," or collectively as "DUs 1503"), and one or more Radio Units ("RUs") 1501-1 through 1501-M (referred to individually as "RU 1501," or collectively as "RUs 1501").

CU 1505 may communicate with a core of a wireless network (e.g., may communicate with one or more of the devices or systems described above with respect to FIG. 14, such as AMF 1415 and/or UPF/PGW-U 1435). In the uplink direction (e.g., for traffic from UEs 107 to a core network), CU 1505 may aggregate traffic from DUs 1503, and forward the aggregated traffic to the core network. In some embodiments, CU 1505 may receive traffic according to a given protocol (e.g., Radio Link Control ("RLC")) from DUs 1503, and may perform higher-layer processing (e.g., may aggregate/process RLC packets and generate Packet Data Convergence Protocol ("PDCP") packets based on the RLC packets) on the traffic received from DUs 1503.

In accordance with some embodiments, CU 1505 may receive downlink traffic (e.g., traffic from the core network) for a particular UE 107, and may determine which DU(s) 1503 should receive the downlink traffic. DU 1503 may include one or more devices that transmit traffic between a core network (e.g., via CU 1505) and UE 107 (e.g., via a respective RU 1501). DU 1503 may, for example, receive traffic from RU 1501 at a first layer (e.g., physical ("PHY") layer traffic, or lower PHY layer traffic), and may process/aggregate the traffic to a second layer (e.g., upper PHY and/or RLC). DU 1503 may receive traffic from CU 1505 at the second layer, may process the traffic to the first layer, and provide the processed traffic to a respective RU 1501 for transmission to UE 107.

RU 1501 may include hardware circuitry (e.g., one or more RF transceivers, antennas, radios, and/or other suitable hardware) to communicate wirelessly (e.g., via an RF interface) with one or more UEs 107, one or more other DUs 1503 (e.g., via RUs 1501 associated with DUs 1503), and/or any other suitable type of device. In the uplink direction, RU 1501 may receive traffic from UE 107 and/or another DU 1503 via the RF interface and may provide the traffic to DU 1503. In the downlink direction, RU 1501 may receive traffic from DU 1503, and may provide the traffic to UE 107 and/or another DU 1503.

RUs 1501 may, in some embodiments, be communicatively coupled to one or more Multi-Access/Mobile Edge Computing ("MEC") devices, referred to sometimes herein simply as "MECs" 1507. For example, RU 1501-1 may be communicatively coupled to MEC 1507-1, RU 1501-M may be communicatively coupled to MEC 1507-M, DU 1503-1 may be communicatively coupled to MEC 1507-2, DU 1503-N may be communicatively coupled to MEC 1507-N, CU 1505 may be communicatively coupled to MEC 1507-3, and so on. MECs 1507 may include hardware resources (e.g., configurable or provisionable hardware resources) that may be configured to provide services and/or otherwise process traffic to and/or from UE 107, via a respective RU 1501.

For example, RU 1501-1 may route some traffic, from UE 107, to MEC 1507-1 instead of to a core network (e.g., via DU 1503 and CU 1505). MEC 1507-1 may process the traffic, perform one or more computations based on the received traffic, and may provide traffic to UE 107 via RU 1501-1. In this manner, ultra-low latency services may be provided to UE 107, as traffic does not need to traverse DU 1503, CU 1505, and an intervening backhaul network between DU network 1500 and the core network. In some embodiments, MEC 1507 may include, and/or may implement, some or all of the functionality described above with respect to navigation system 101 and/or road information repository 103.

Figure 16:
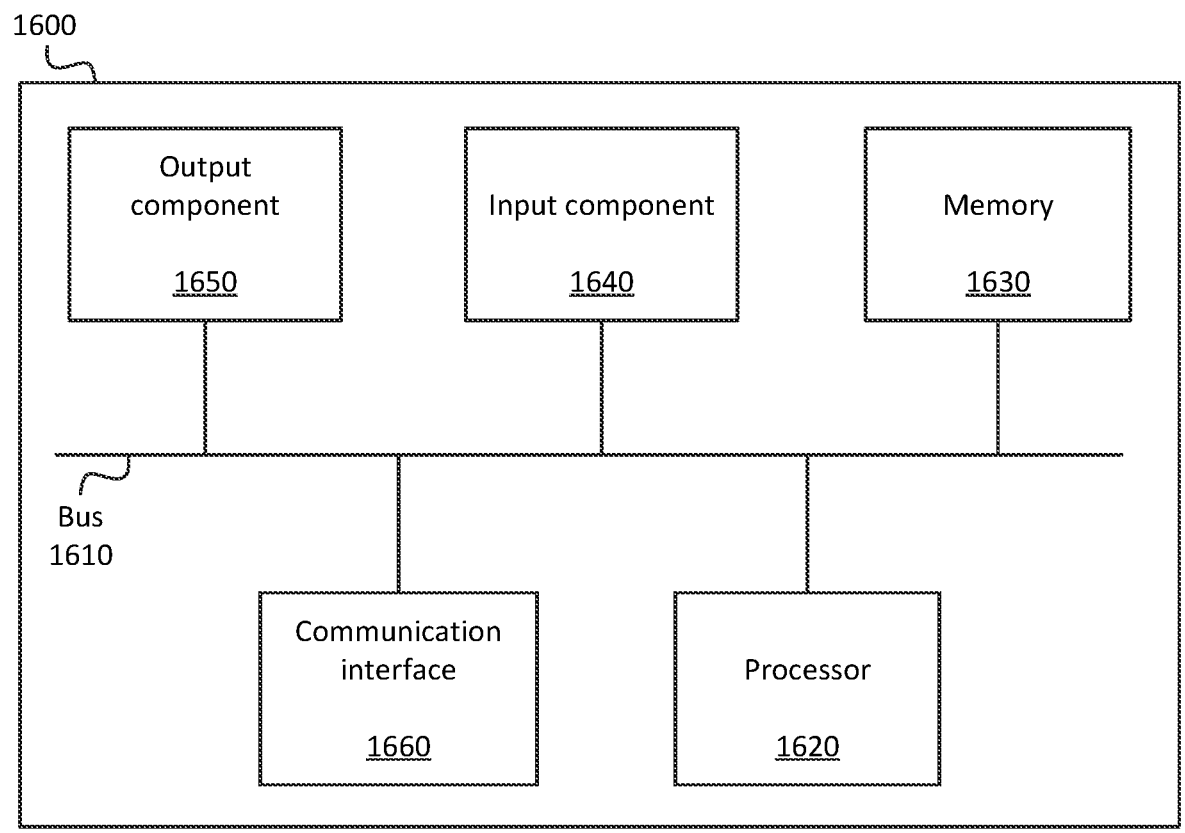
FIG. 16 illustrates example components of one or more devices, in accordance with one or more embodiments described herein.

FIG. 16 illustrates example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. In some embodiments, processor 1620 may be or may include one or more hardware processors. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600 and/or other receives or detects input from a source external to 1640, such as a touchpad, a touchscreen, a keyboard, a keypad, a button, a switch, a microphone or other audio input component, etc. In some embodiments, input component 1640 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a navigation request specifying a starting location and a destination;
determine a priority score associated with each node of a plurality of nodes,
wherein a first node of the plurality of nodes is associated with the destination, and
wherein a second node of the plurality of nodes is associated with the starting location;
perform a first search starting from the first node and in ascending order of priority scores, wherein performing the first search includes identifying one or more paths that begin at the first node and include one or more additional nodes of the plurality of nodes, wherein the one or more paths are in ascending order of priority scores of the respective nodes of which the one or more paths are comprised;
identify a subset of nodes, of the plurality of nodes, based on performing the first search;
perform one or more iterations of a second search starting from the second node and in ascending order of priority scores, wherein performing a particular iteration of the second search includes:
reaching a third node via the particular iteration,
determining whether to search in ascending or descending order of priority scores based on whether the third node, reached via the particular iteration, is in the subset of nodes, wherein the determining includes:
when the third node, reached via the particular iteration, is not in the subset of nodes, determining to perform a next iteration of the second search in ascending order of priority scores, and
when the third node, reached via the particular iteration, is in the subset of nodes, determining to initiate a third search starting from the third node in descending order of priority scores, wherein performing the third search includes traversing one or more nodes, of the subset of nodes, in descending order of priority starting at the third node;
perform one of:
the next iteration of the second search in ascending order of priority when determining to perform the next iteration of the second search, or
the third search in descending order of priority when determining to initiate the third search;
identify a first path from the second node to the first node, wherein the first path includes nodes traversed via the second search and the third search;
identify a second path from the second node to the first node;
receive real time road information associated with the first and second paths;
identify, based on the real time road information associated with the first path and using one or more artificial intelligence/machine learning ("AI/ML") models, a first cost associated with the first path;
identify, based on the real time road information associated with the second path and using the one or more AI/ML models, a second cost associated with the second path;
compare the first cost associated with the first path to the second cost associated with the second path;
select, based on the comparing, the first path; and
provide a response to the navigation request, wherein the response includes the selected first path from the second node to the first node.

2. The device of claim 1, wherein performing the third search includes traversing only one or more nodes of the subset of nodes, without traversing nodes of the plurality of nodes that are not in the subset of nodes.

3. The device of claim 1, wherein the one or more processors are further configured to:
identify that the first path is associated with a lower cost than the second path; and
select the first path based on the identification that the first path is associated with the lower cost than the second path.

4. The device of claim 1, wherein the one or more processors are further configured to:
perform a plurality of iterations of at least one of the first search, the second search, or the third search to identify the first and second paths from the second node to the first node.

5. The device of claim 1, wherein the response to the navigation request is used by an autonomous or semi-autonomous vehicle to travel from the starting location to the destination.

6. The device of claim 1, wherein the next iteration of the second search is a second iteration of the second search, wherein performing the second iteration of the second search includes:
reaching a fourth node via the second iteration;
identifying that the third node is in the subset of nodes; and
performing a third iteration of the second search, subsequent to the second iteration, wherein performing the third iteration includes continuing to perform the second search, from the fourth node, in ascending order of priority scores.

7. The device of claim 1, wherein links between the plurality of nodes each represent at least one of:
a road,
an intersection, or
a shortcut associated with a contraction hierarchy.

8. A non-transitory computer-readable medium, storing a plurality of processor-executable instructions to:
receive a navigation request specifying a starting location and a destination;
determine a priority score associated with each node of a plurality of nodes,
wherein a first node of the plurality of nodes is associated with the destination, and
wherein a second node of the plurality of nodes is associated with the starting location;
perform a first search starting from the first node and in ascending order of priority scores, wherein performing the first search includes identifying one or more paths that begin at the first node and include one or more additional nodes of the plurality of nodes, wherein the one or more paths are in ascending order of priority scores of the respective nodes of which the one or more paths are comprised;

identify a subset of nodes, of the plurality of nodes, based on performing the first search;

perform one or more iterations of a second search starting from the second node and in ascending order of priority scores, wherein performing a particular iteration of the second search includes:

reaching a third node via the particular iteration, determining whether to search in ascending or descending order of priority scores based on whether the third node, reached via the particular iteration, is in the subset of nodes, wherein the determining includes:

when the third node, reached via the particular iteration, is not in the subset of nodes, determining to perform a next iteration of the second search in ascending order of priority scores, and when the third node, reached via the particular iteration, is in the subset of nodes, determining to initiate a third search starting from the third node in descending order of priority scores, wherein performing the third search includes traversing one or more nodes, of the subset of nodes, in descending order of priority starting at the third node;

perform one of:

the next iteration of the second search in ascending order of priority when determining to perform the next iteration of the second search, or the third search in descending order of priority when determining to initiate the third search;

identify a first path from the second node to the first node, wherein the first;

identify a second path from the second node to the first node;

receive real time road information associated with the first and second paths;

identify, based on the real time road information associated with the first path and using one or more artificial intelligence/machine learning ("AI/ML") models, a first cost associated with the first path;

identify, based on the real time road information associated with the second path and using the one or more AI/ML models, a second cost associated with the second path;

compare the first cost associated with the first path to the second cost associated with the second path;

select, based on the comparing, the first path; and provide a response to the navigation request, wherein the response includes the selected first path from the second node to the first node.

9. The non-transitory computer-readable medium of claim 8, wherein performing the third search includes traversing only one or more nodes of the subset of nodes, without traversing nodes of the plurality of nodes that are not in the subset of nodes.

10. The non-transitory computer-readable medium of claim 8, wherein the plurality of processor-executable instructions further include processor-executable instructions to:

identify that the first path is associated with a lower cost than the second path; and select the first path based on the identification that the first path is associated with the lower cost than the second path.

11. The non-transitory computer-readable medium of claim 8, wherein links between the plurality of nodes each represent at least one of:

a road, an intersection, or a shortcut associated with a contraction hierarchy.

12. The non-transitory computer-readable medium of claim 8, wherein the plurality of processor-executable instructions further include processor-executable instructions to:

perform a plurality of iterations of at least one of the first search, the second search, or the third search to identify the first and second paths from the second node to the first node.

13. The non-transitory computer-readable medium of claim 8, wherein the next iteration of the second search is a second iteration of the second search, wherein performing the second iteration of the second search includes:

reaching a fourth node via the second iteration;

identifying that the third node is in the subset of nodes; and performing a third iteration of the second search, subsequent to the second iteration, wherein performing the third iteration includes continuing to perform the second search, from the fourth node, in ascending order of priority scores.

14. A method, comprising:

receiving a navigation request specifying a starting location and a destination;

determining a priority score associated with each node of a plurality of nodes, wherein a first node of the plurality of nodes is associated with the destination, and wherein a second node of the plurality of nodes is associated with the starting location;

performing a first search starting from the first node and in ascending order of priority scores, wherein performing the first search includes identifying one or more paths that begin at the first node and include one or more additional nodes of the plurality of nodes, wherein the one or more paths are in ascending order of priority scores of the respective nodes of which the one or more paths are comprised;

identifying a subset of nodes, of the plurality of nodes, based on performing the first search;

performing one or more iterations of a second search starting from the second node and in ascending order of priority scores, wherein performing a particular iteration of the second search includes:

reaching a third node via the particular iteration, determining whether to search in ascending or descending order of priority scores based on whether the third node, reached via the particular iteration, is in the subset of nodes, wherein the determining includes:

when the third node, reached via the particular iteration, is not in the subset of nodes, determining to perform a next iteration of the second search in ascending order of priority scores, and when the third node, reached via the particular iteration, is in the subset of nodes, determining to initiate a third search starting from the third node in descending order of priority scores, wherein performing the third search includes traversing one or more nodes, of the subset of nodes, in descending order of priority starting at the third node;

perform one of:
- the next iteration of the second search in ascending order of priority when determining to perform the next iteration of the second search, or
- the third search in descending order of priority when determining to initiate the third search;

identifying a first path from the second node to the first node, wherein the first path includes nodes traversed via the second search and the third search;

identifying a second path from the second node to the first node;

receiving real time road information associated with the first and second paths;

identifying, based on the real time road information associated with the first path and using one or more artificial intelligence/machine learning ("AI/ML") models, a first cost associated with the first path;

identifying, based on the real time road information associated with the second path and using the one or more AI/ML models, a second cost associated with the second path;

comparing the first cost associated with the first path to the second cost associated with the second path;

selecting, based on the comparing, the first path; and providing a response to the navigation request, wherein the response includes the first path from the second node to the first node.

15. The method of claim 14, wherein performing the third search includes traversing only one or more nodes of the subset of nodes, without traversing nodes of the plurality of nodes that are not in the subset of nodes.

16. The method of claim 14, further comprising:
- identifying that the first path is associated with a lower cost than the second path; and
- selecting the first path based on the identification that the first path is associated with the lower cost than the second path.

17. The method of claim 14, further comprising:
- performing a plurality of iterations of at least one of the first search, the second search, or the third search to identify the first and second paths from the second node to the first node.

18. The method of claim 14, wherein the response to the navigation request is used by an autonomous or semi-autonomous vehicle to travel from the starting location to the destination.

19. The method of claim 14, wherein the next iteration of the second search is a second iteration of the second search, wherein performing the second iteration of the second search includes:
- reaching a fourth node via the second iteration;
- identifying that the third node is in the subset of nodes; and
- performing a third iteration of the second search, subsequent to the second iteration, wherein performing the third iteration includes continuing to perform the second search, from the fourth node, in ascending order of priority scores.

20. The method of claim 14, wherein links between the plurality of nodes each represent at least one of:
- a road,
- an intersection, or
- a shortcut associated with a contraction hierarchy.

* * * * *